(12) United States Patent
Strong et al.

(10) Patent No.: US 9,598,126 B2
(45) Date of Patent: Mar. 21, 2017

(54) AUTOMATIC AUXILIARY AXLE CONTROL SYSTEM

(71) Applicants: Brooks Strong, Houston, TX (US); Joshua Cayne Fisher, Montgomery, TX (US)

(72) Inventors: Brooks Strong, Houston, TX (US); Joshua Cayne Fisher, Montgomery, TX (US)

( * ) Notice: Subject to any disclaimer, the term of this patent is extended or adjusted under 35 U.S.C. 154(b) by 0 days.

(21) Appl. No.: 14/803,045

(22) Filed: Jul. 18, 2015

(65) Prior Publication Data

US 2017/0015372 A1 Jan. 19, 2017

(51) Int. Cl.
*B62D 61/12* (2006.01)
*B62D 53/06* (2006.01)

(52) U.S. Cl.
CPC ......... *B62D 61/125* (2013.01); *B62D 53/068* (2013.01)

(58) Field of Classification Search
CPC .................. B62D 61/125; B62D 53/068
See application file for complete search history.

(56) References Cited

U.S. PATENT DOCUMENTS

| | | | | |
|---|---|---|---|---|
| 4,146,243 A * | 3/1979 | Sims | ..................... | B62D 61/125 180/24.02 |
| 4,157,188 A * | 6/1979 | Sims | ..................... | B62D 61/125 280/43 |
| 4,492,389 A * | 1/1985 | Wyatt | .................. | B62D 61/125 280/43.23 |
| 4,705,133 A * | 11/1987 | Christenson | ......... | B62D 61/125 180/209 |
| 5,597,174 A * | 1/1997 | Christenson | ............. | B60G 5/04 180/209 |
| 6,203,045 B1 * | 3/2001 | Kyrtsos | ................ | B62D 53/068 280/405.1 |
| 6,247,712 B1 * | 6/2001 | Smith | .................... | B62D 61/12 180/209 |
| 2012/0187656 A1 * | 7/2012 | Albert | ................ | B60G 17/0162 280/405.1 |
| 2016/0257355 A1 * | 9/2016 | Siuchta | ................ | B62D 53/068 |

* cited by examiner

*Primary Examiner* — Drew Brown

(57) ABSTRACT

An automatic auxiliary axle control system is disclosed for a load-transporting motor vehicle having two or more primary axles and one or more auxiliary axles wherein the control system detects a noncompliant axle carrying weight condition when the weight of the vehicle acting on any one of the primary axles exceeds a prescribed maximum allowable axle carrying weight assigned to that axle and also when the weight acting on any group of the axles arranged consecutively exceeds a prescribed maximum allowable axle group carrying weight assigned to that axle group. And the control system on such detection effects auxiliary axle usage that results in no maximum allowable axle carrying weight and maximum allowable axle group carrying weight being exceeded provided the current gross vehicle weight does not exceed a prescribed maximum allowable gross vehicle weight determined by all of the axles and the current center of gravity of the vehicle is located within a certain compliance-manageable range. And with the control system also capable of effecting auxiliary axle usage outside this range suited to the existing condition, providing control over auxiliary axle usage by an operator of the vehicle, and producing useful information.

70 Claims, 19 Drawing Sheets

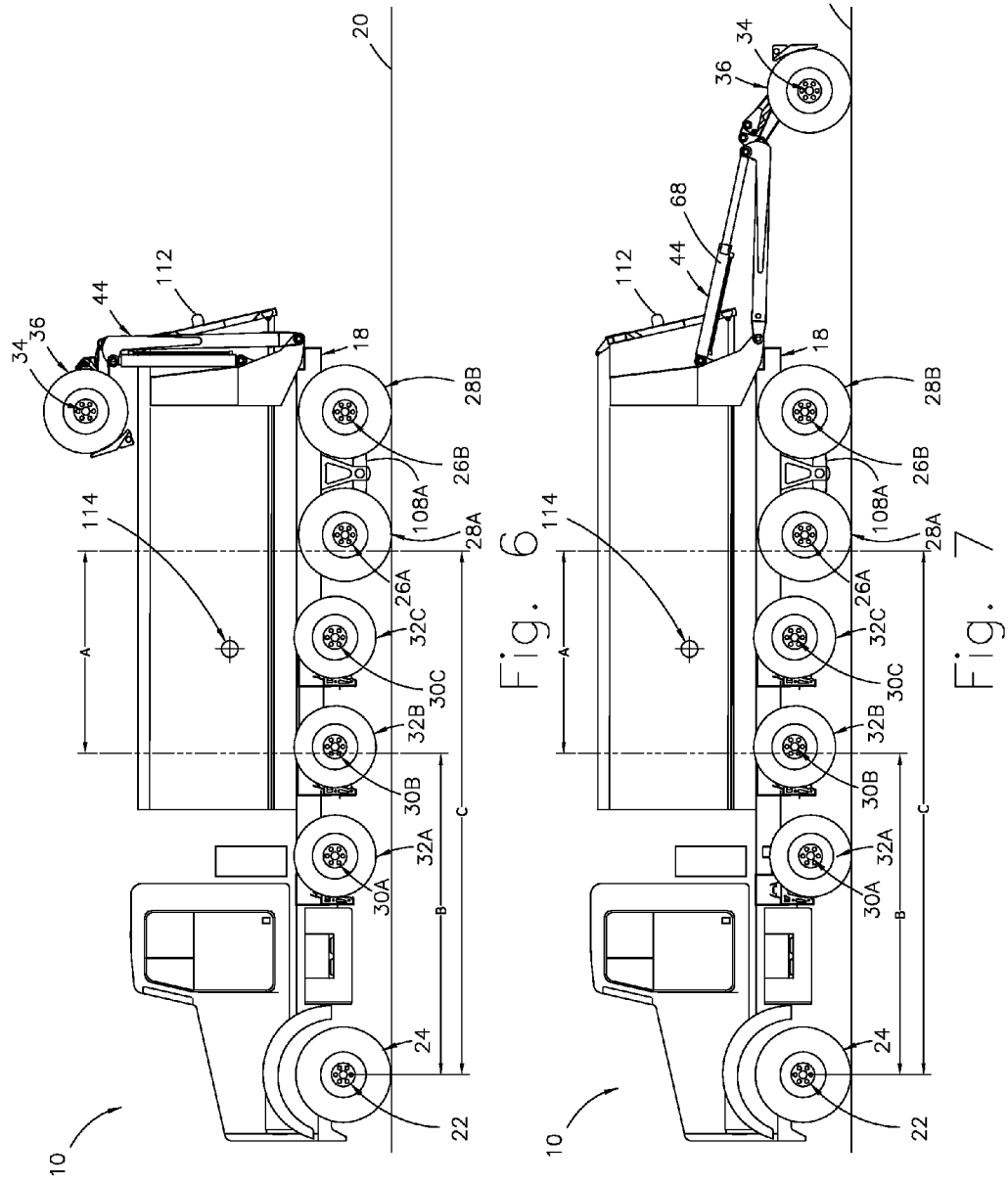

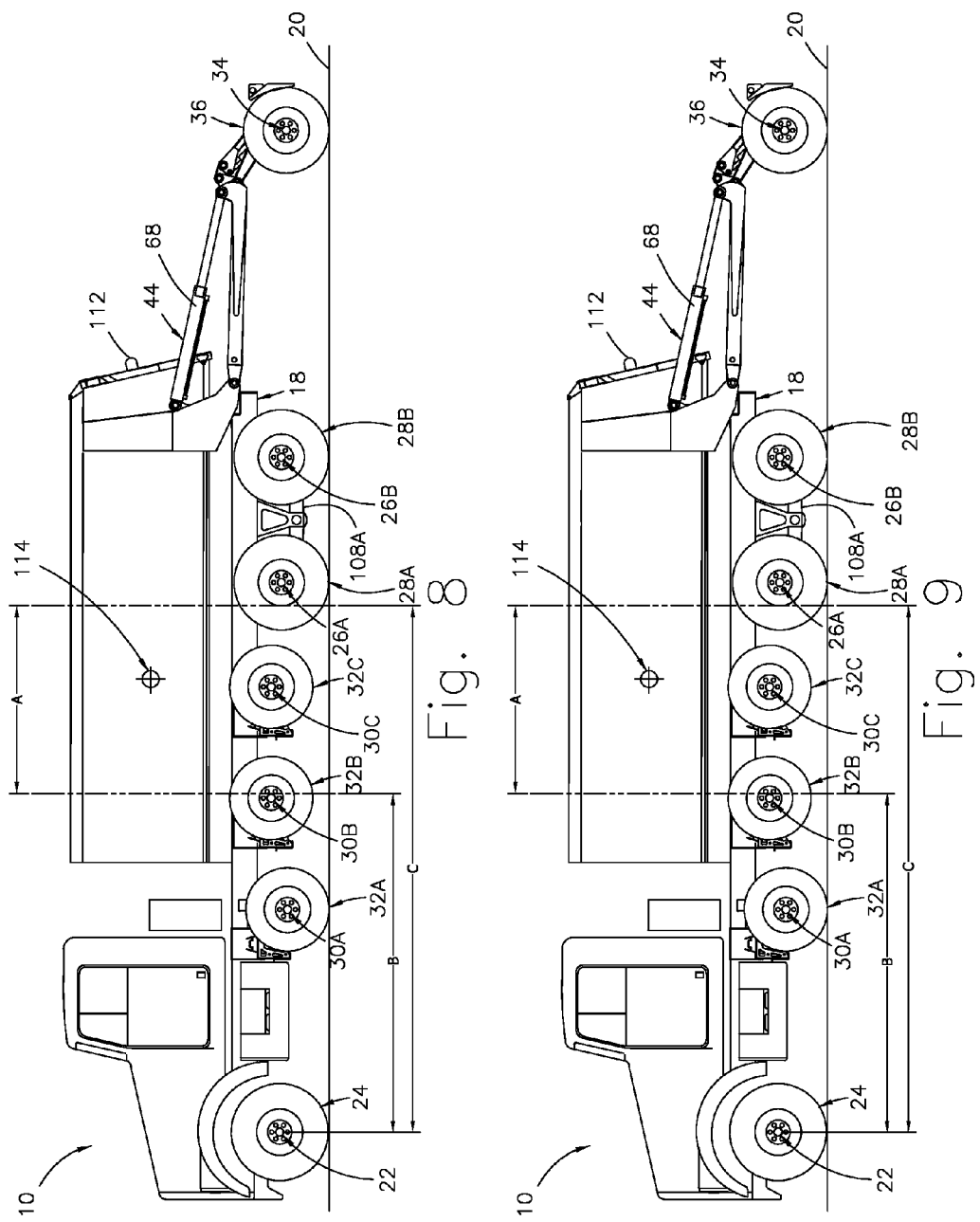

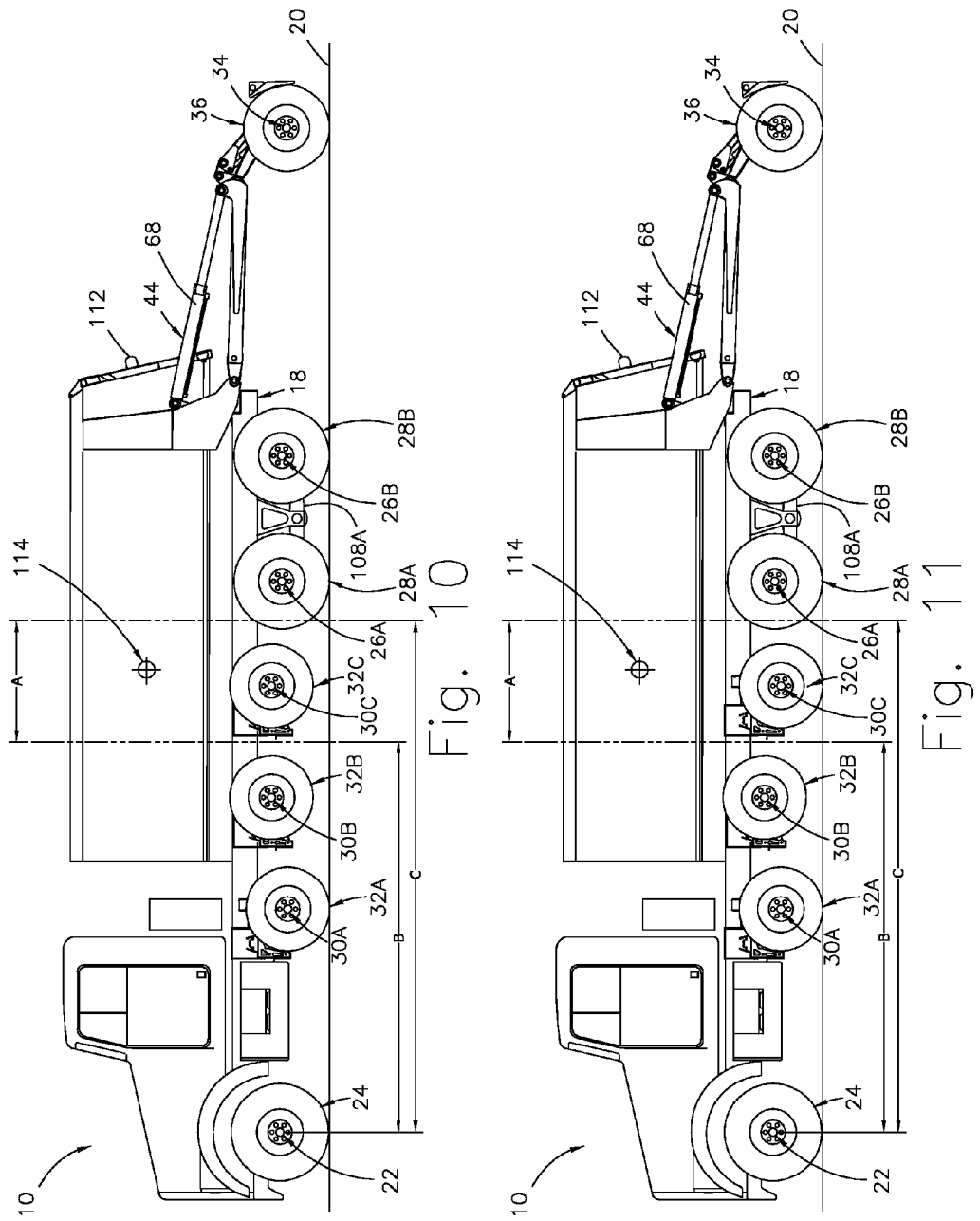

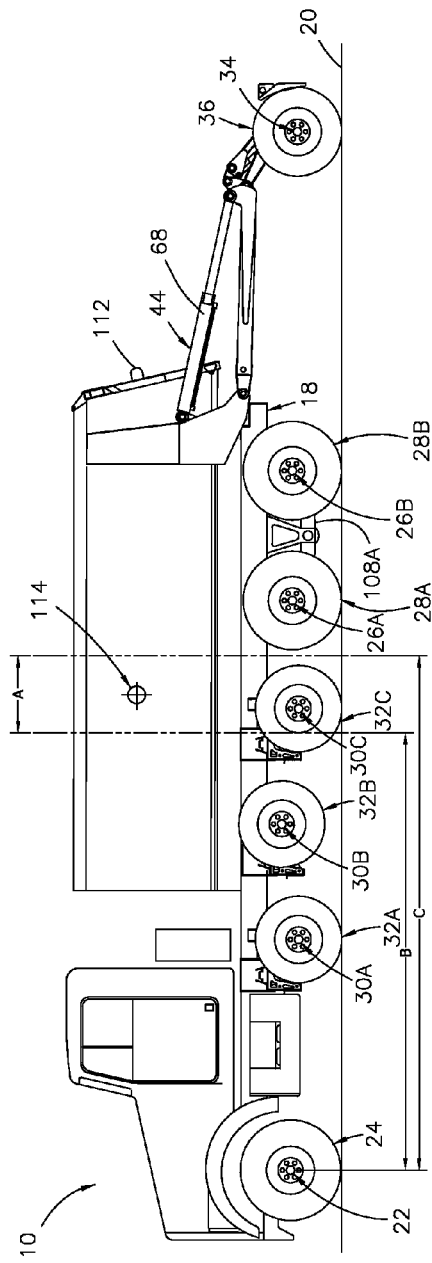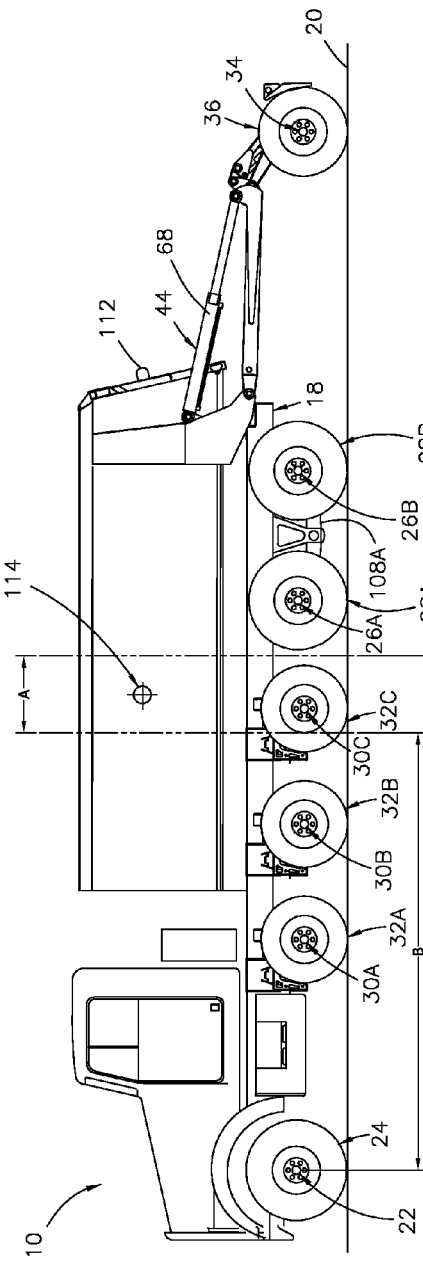

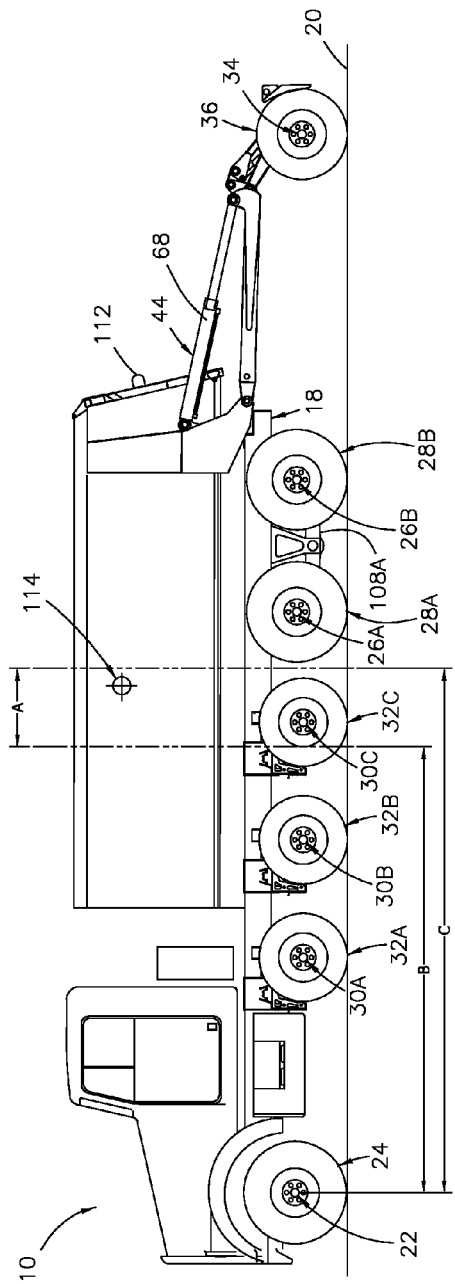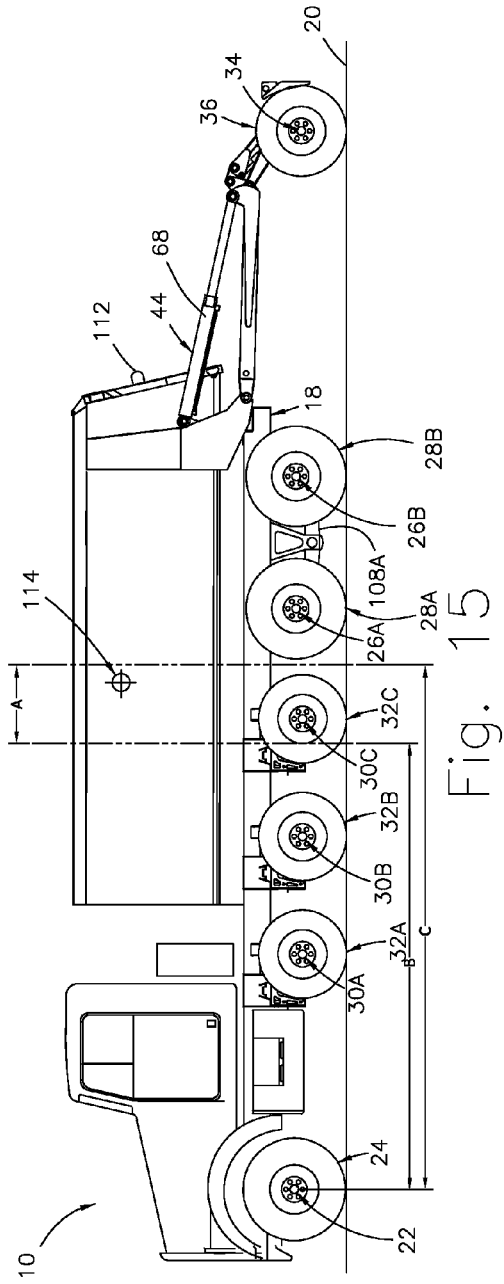

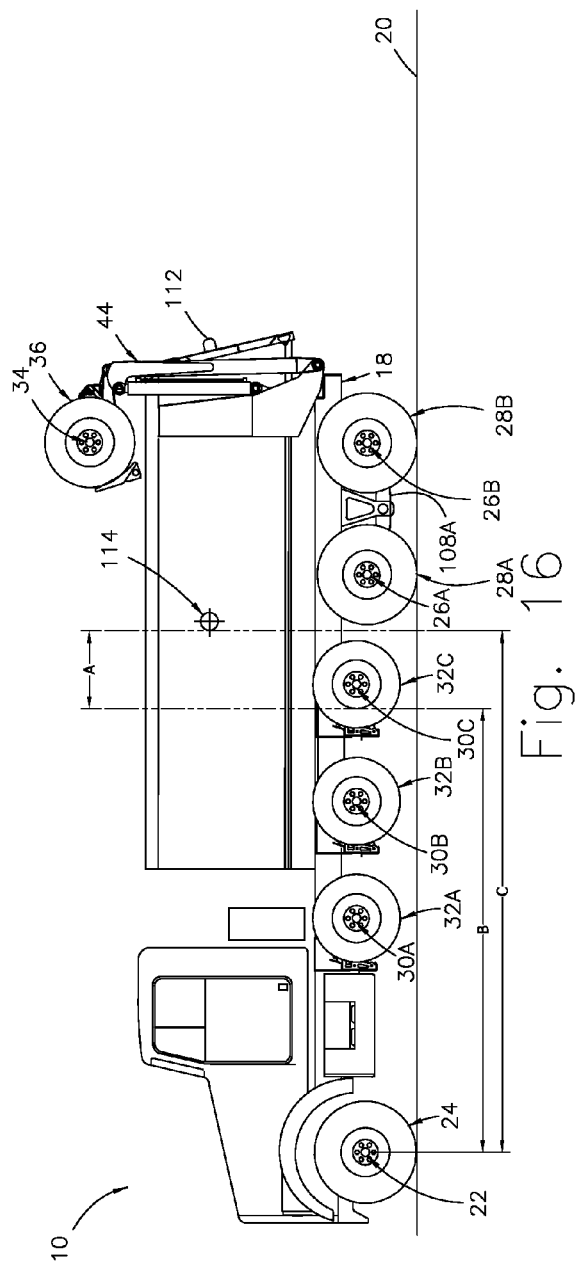
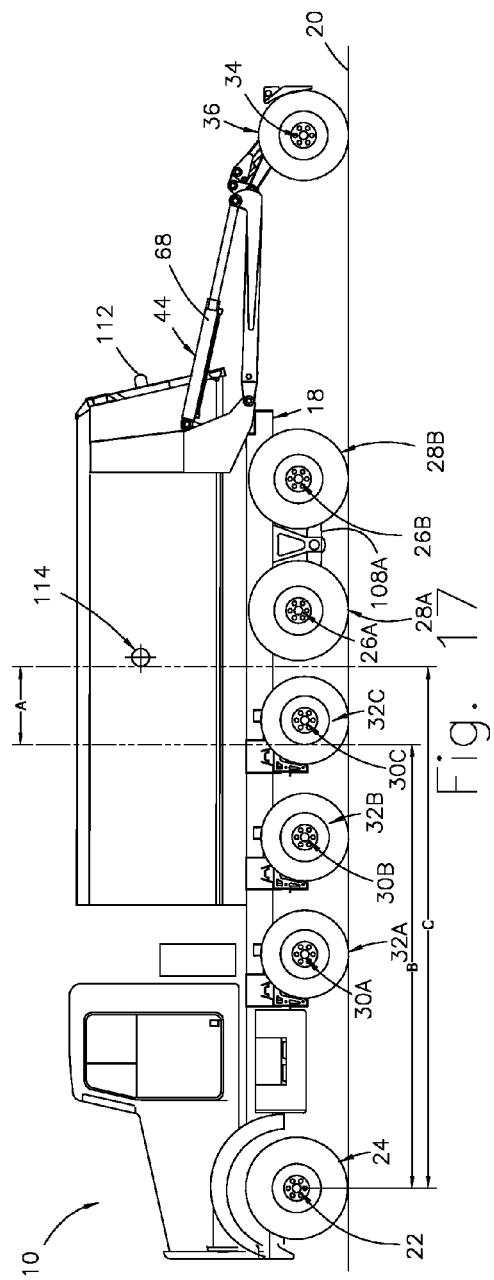

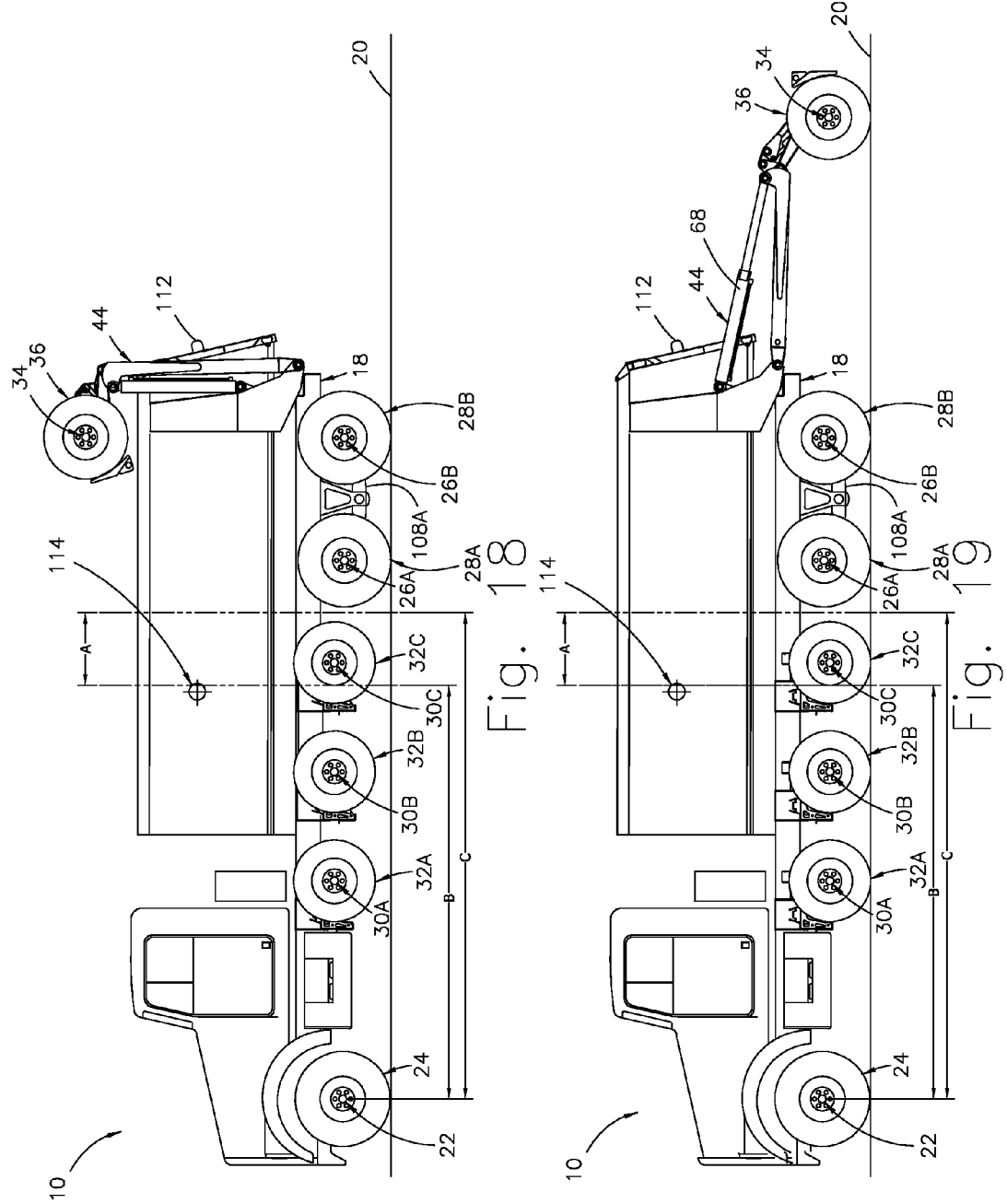

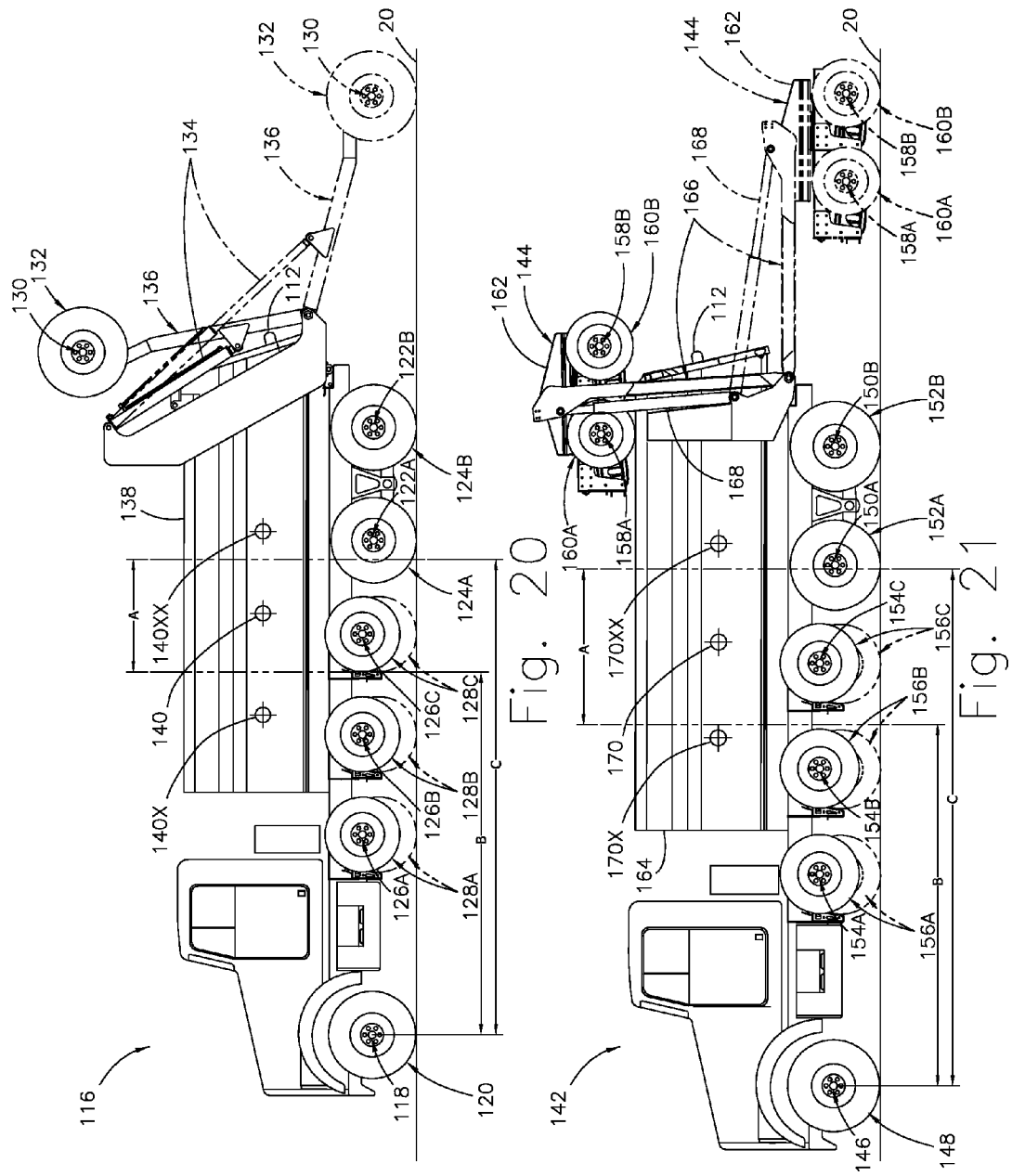

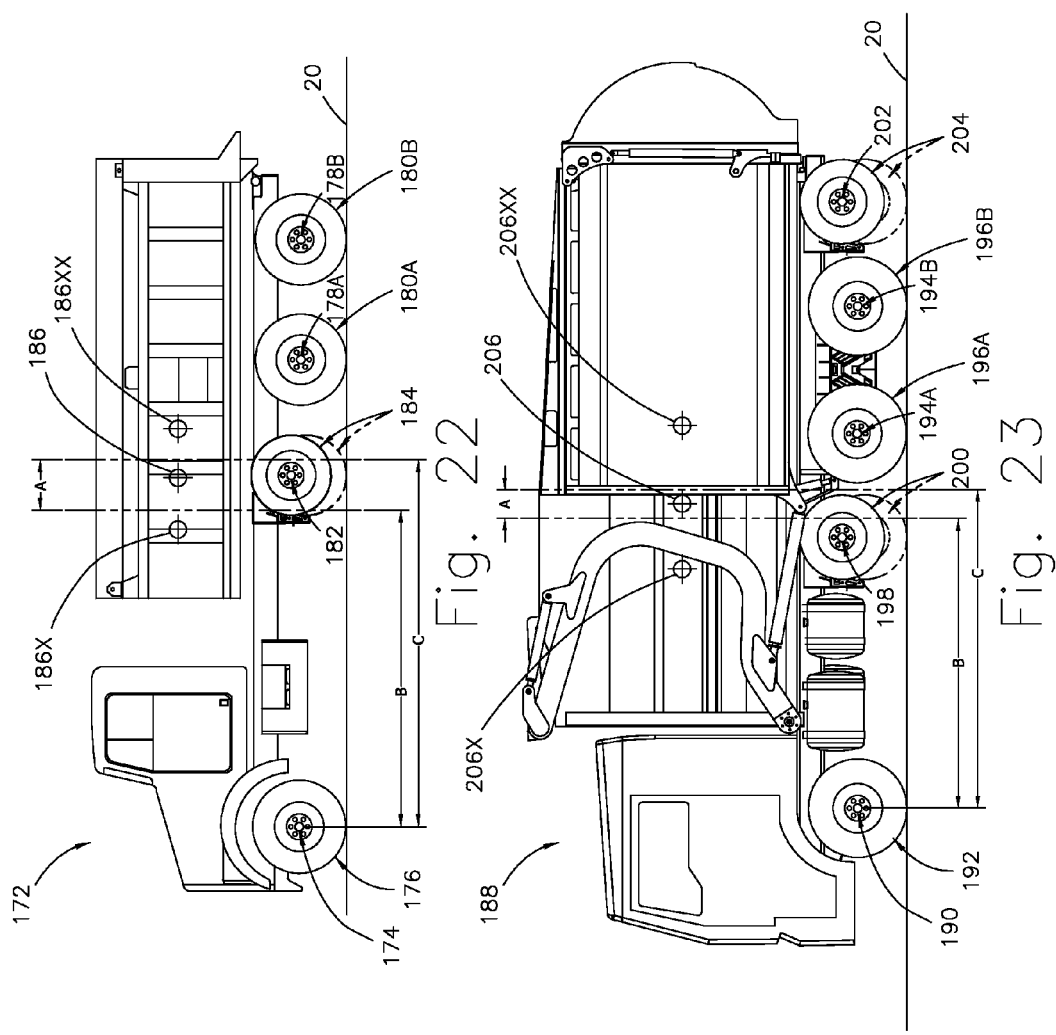

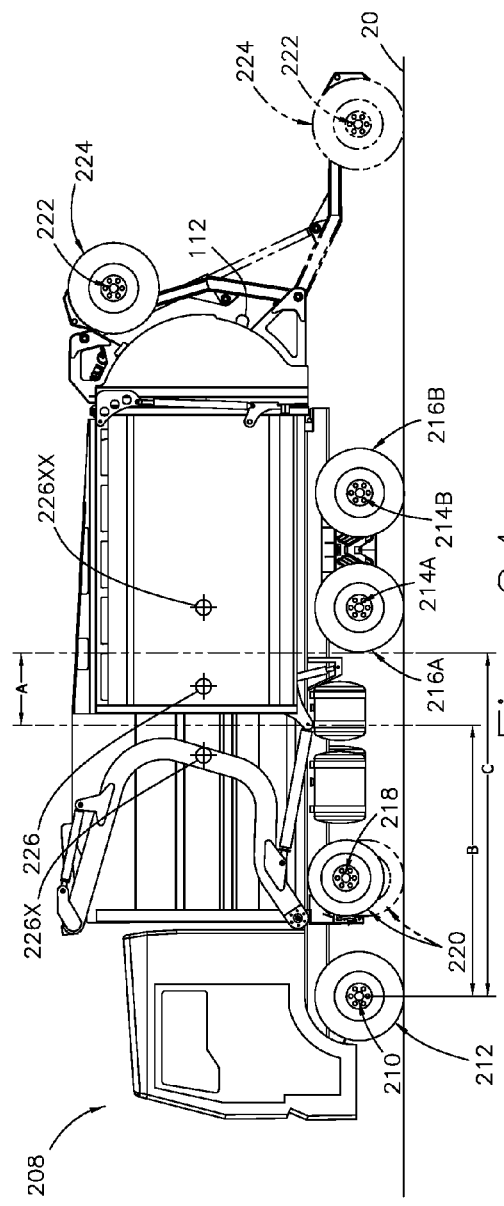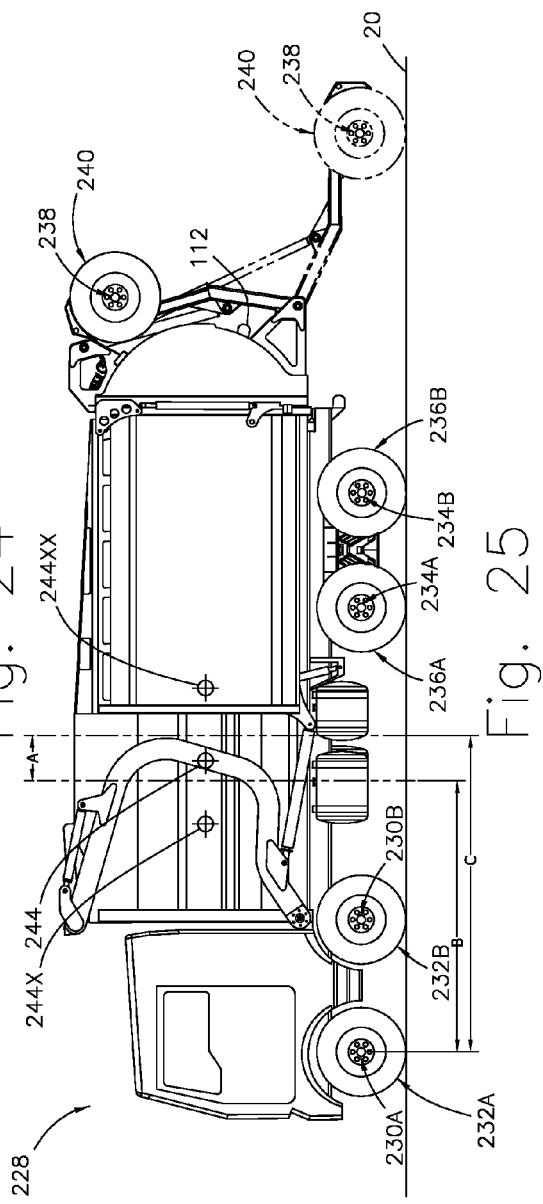

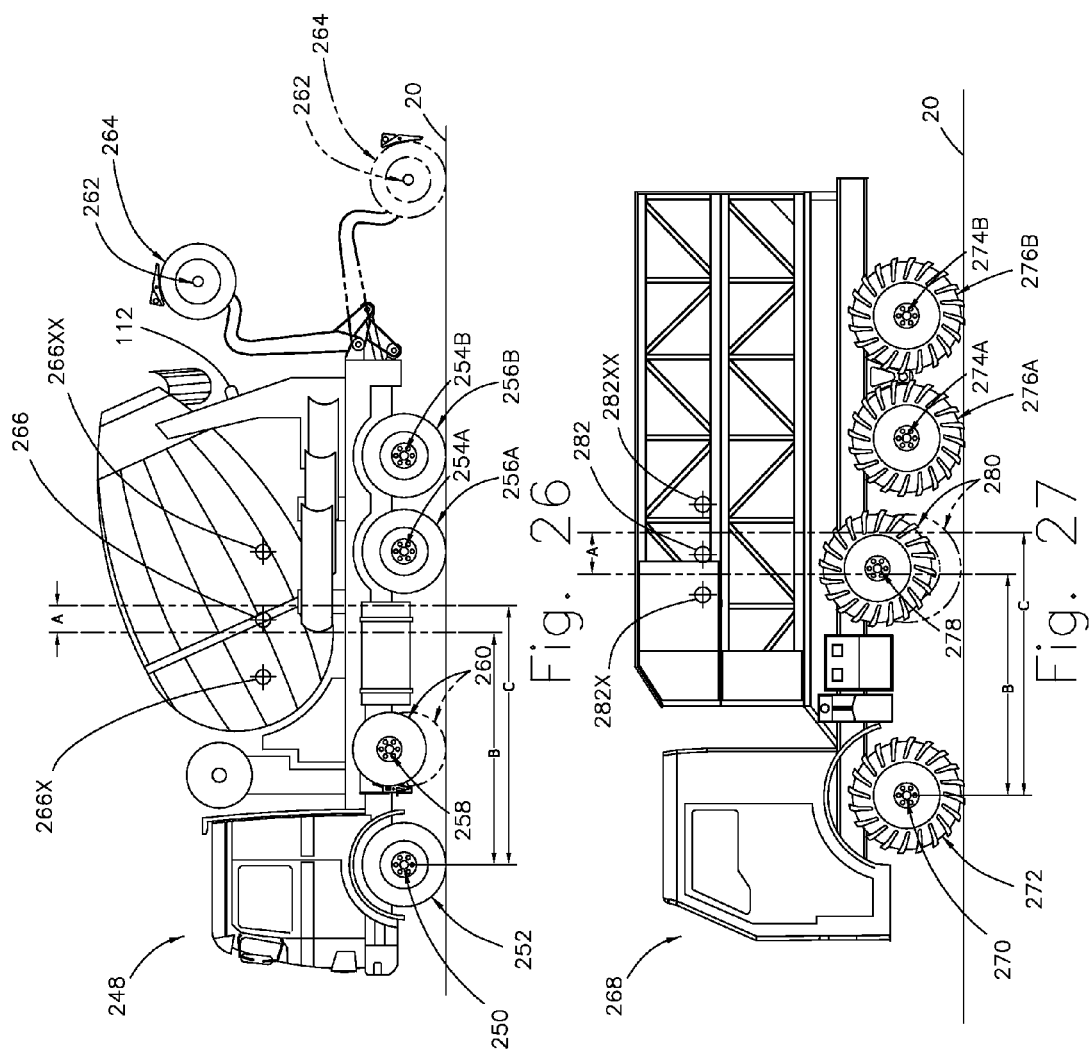

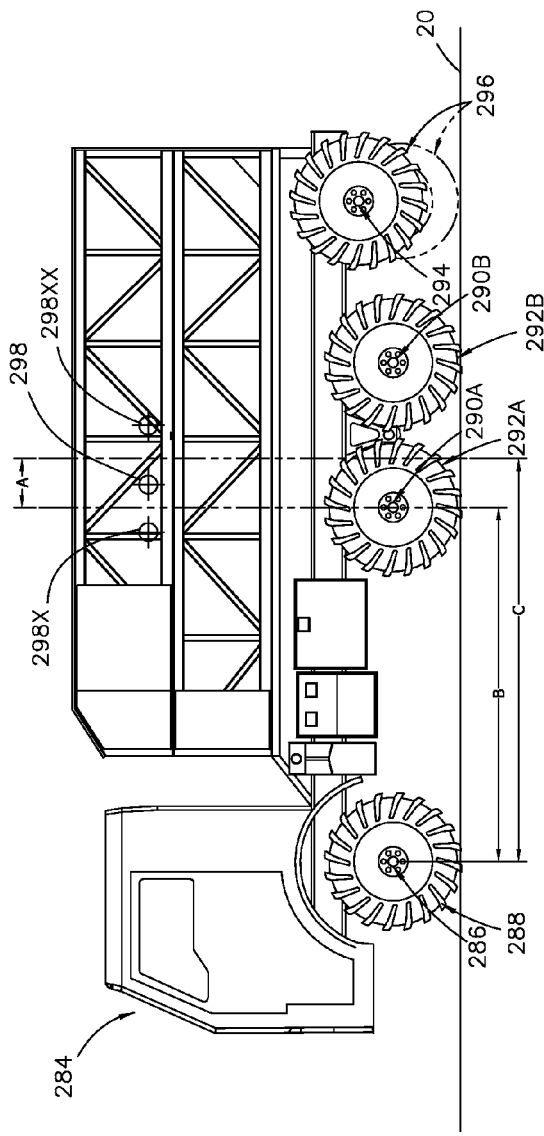
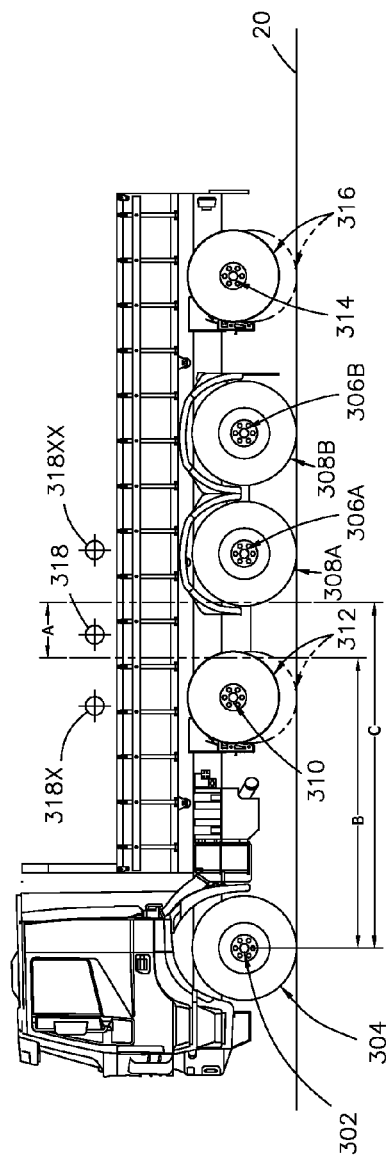

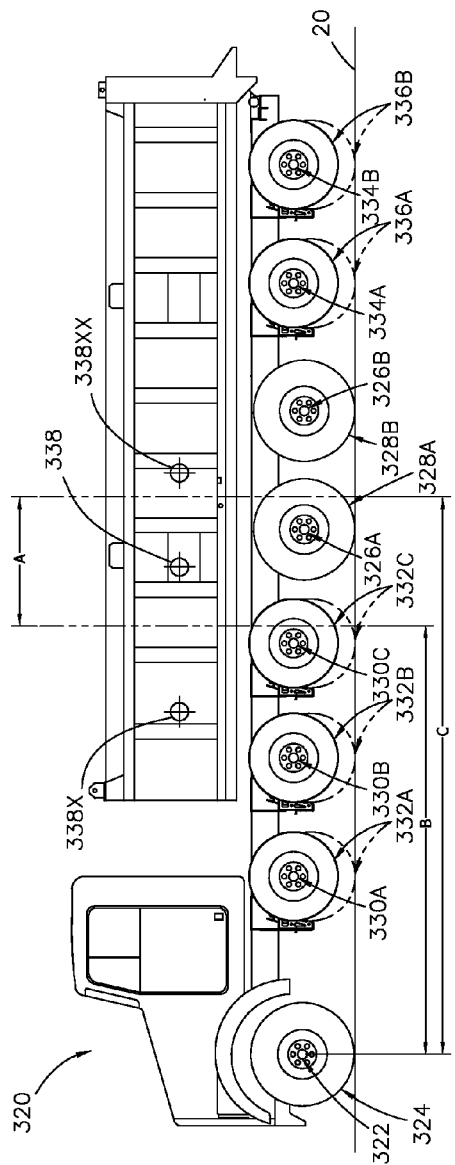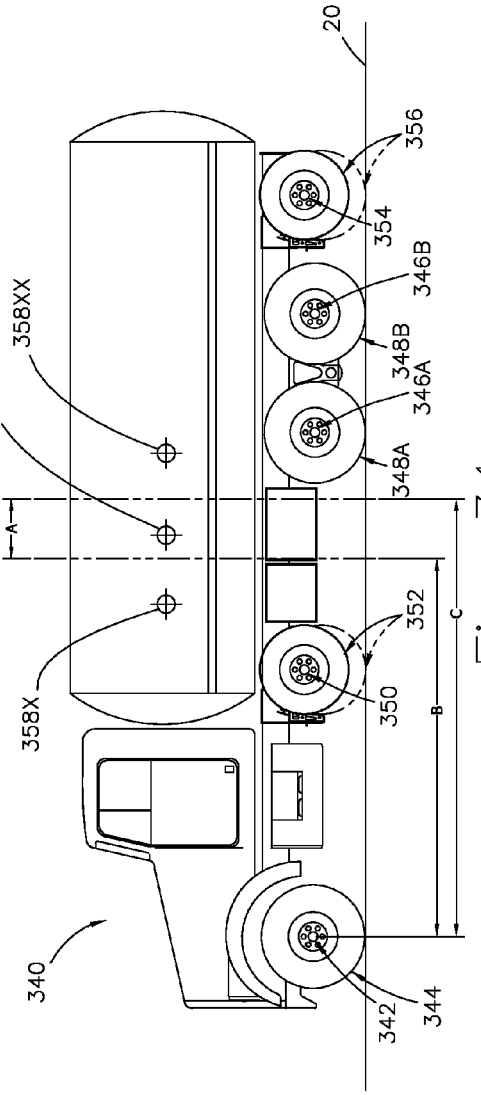

AUTOMATIC AUXILIARY AXLE CONTROL SYSTEM

TECHNICAL FIELD

This invention relates to auxiliary axle control systems for load-transporting motor vehicles and more particularly to those controlling the deployment and the weight carried by one or more auxiliary axles and thereby the weight carried by all of the axles supporting the vehicle and is related to U.S. patent application Ser. No. 14/803,038 entitled (DUAL TRAILING AXLE SUSPENSION SYSTEM", U.S. patent application Ser. No. 14/803,041 entitled "TRAILER HITCH", and U.S. patent application Ser. No. 14/803,048 entitled "AXLE LOAD MONITORING SYSTEM".

BACKGROUND OF THE INVENTION

Load-transporting motor vehicles such as dump trucks, refuse trucks, transit concrete mixing trucks, open-bed trucks, utility trucks, military trucks and other vehicles of various types to which a significant load may be added for transport are limited in their load transporting ability by various factors. Such as the weight bearing capacity of their supporting axles and applicable federal and state law. With such laws for example limiting the gross vehicle weight to 80,000 pounds, the weight carried by a single axle to 20,000 pounds and there being an exception as to consecutive axles that limits them to carrying a prescribed combined weight depending on their number and spacing. For example, the combined axle carrying weight is limited to 34,000 pounds in regard to the two powered tandem axles that are typically employed with heavy duty load-transporting motor vehicles. And with such factors as a result impacting the use of load-transporting vehicles in that the more weight the vehicle can transport at a time, the more useful the vehicle can be provided other factors that impact the ability of the vehicle to perform in an acceptable manner are also taken into account. With such factors including the axle manufacturers rated load capacity.

And in regard to load-transporting motor vehicles that carry significantly heavy loads, they typically have primary axles that continuously support the vehicle and one or more auxiliary axles that are available to help support the vehicle in supporting such loads. Wherein the primary axles typically comprise a forwardly-located axle with steerable wheels and one or more rearwardly-located powered axles. And wherein the auxiliary axles are deployable and forcibly loaded to help carry the weight of the vehicle and thereby reduce the weight carried by the primary axles and are referred to as either a pusher axle, tag axle or trailing axle to distinguish between them. With the understanding that a pusher axle is suspended from the vehicle chassis in a location to operate between a forwardly located primary axle with steerable wheels and one or more rearwardly located powered axles with wheels and a tag axle is suspended from the vehicle chassis to operate rearward of one or more powered axles but not normally beyond the rear end of the chassis. Whereas a trailing axle that has also been referred to as a tag axle and trailing tag axle is also suspended from the vehicle chassis but in a manner to operate at a substantial distance rearward of the chassis.

Among the challenges faced in employing auxiliary axles, whether it is a pusher axle or a tag axle or a trailing axle, is in first determining whether auxiliary axle use is needed and then in determining the down force to be applied to the auxiliary axle(s) deployed and thereby the weight of the vehicle they carry. As this determines the extent to which the primary axles then carry the weight of the vehicle while also continuing to serve as intended with regard to vehicle performance such as in providing for suitable steerage, traction and braking.

For example and apart from servicing, if a trailing axle is deployed but is actually not needed for additional vehicle support, it should be sufficiently forced downward for trailing axle stability as otherwise it would be serving no useful purpose and could adversely affect the road performance of the vehicle. While on the other hand, if one or more auxiliary axles are deployed with the addition of a load and forced to support the vehicle weight necessary to meet restrictions governing the weights carried by the supporting axles and a maximum allowable gross vehicle weight, one or more of the primary axles while meeting the governing restrictions may be loaded beyond its maximum allowable carrying weight. Furthermore, when the wheels of an auxiliary axle that is acted on with a significantly low down force passes over sudden elevation changes such as in the case of a pothole or dip in a road surface, there are sudden dynamic forces that can result and are applied to the axle that may not be compatible with the structural design of the axle and its suspension. Moreover, in the case of a trailing axle there may be insufficient down force with regard to contributing to vehicle braking and roll stability as well as helping to support the vehicle.

Then at the other end of the spectrum, if one of the auxiliary axles whether it is a pusher axle or a tag axle or a trailing axle is down forced such that it accepts more vehicle weight than required to meet weight carrying limits on the primary axles, one or more of the latter may lose its ability to adequately perform as intended. For example, adequate steerage and braking at a forward-most primary axle with steerable wheels and adequate traction and braking at one or more rearward primary axles with powered wheels.

In addressing these concerns and viewing currently available load-transporting motor vehicles, most do not have onboard scales for determining the existing vehicle weight or the existing weight on each axle. And those that do typically have onboard scale systems that calculate and display the vehicle weight but not the weight on the individual axles.

And in the case where there is no onboard weight scale system and no weight scales where a load is being added to the vehicle, the vehicle operator is left with determining whether an auxiliary axle needs to be activated and thus depends on the experience of the vehicle operator and especially where there is more than one auxiliary axle available and thus involves needing to make a selection. And the experience of the vehicle operator may or may not extend to handling a particular type of load or various types of loads with different densities and in the manner they are received that may be wholly at one time at a site or with additional loading at another site that also lacks weight scales. Moreover, the choice of whether to activate or deactivate any auxiliary axles is made even more difficult where the vehicle for example makes multiples stops to either drop off part of a load or pick up additional load before reaching the final destination for off-loading.

Then in the case where the vehicle operator does recognize the need to activate one or more auxiliary axles based on experience or training or such is indicated by onboard weight scales or premeasured weights or weight scales at a pickup site, there remains the objective of tailoring the weight carried by an activated auxiliary axle in a significantly beneficial manner. As some auxiliary axles have only on/off capability wherein they apply a preset down force on the activated auxiliary axle that determines the amount of vehicle weight the axle carries/accepts. And this would require the vehicle operator to change the setting if possible for a particular weight if that appears to be needed from the standpoint of either increasing or decreasing the down force on a particular auxiliary axle and thereby the weight carried by this axle and resultantly the primary axle. But this is not a practical thing to do while on the road and in not knowing how much adjustment is actually needed for proper operation.

On the other hand and in the case where there is provided the ability to adjust the down force on the auxiliary axles when they are activated, the auxiliary axles are typically operated with a pressured system that applies a down force to the axle that determines the vehicle weigh it accepts. And the adjustment is typically provided by the vehicle operator observing a pressure gauge connected to the system and operating a control valve to adjust the system pressure relying on pressure readings indicative of the down force on the axle that results. But without knowing the current weight on an auxiliary axle or having some means to determine such, it is not known how much down force to add or subtract and again the vehicle operator is left with making that decision based on experience and/or training and doing the adjusting correctly. And even with a vehicle having onboard weight scales and providing the vehicle operator with the ability to adjust the down forces on the auxiliary axles as described above, these weight scales typically do not detect the weight on a deployed auxiliary axle such as a pusher axle, a tag axle and a trailing axle. And where there is more than one auxiliary axle, the vehicle operator may need to adjust them individually in ensuring that all the axles comply with certain applicable restrictions. And that requires the vehicle operator needing to know the applicable state and federal law that applies to both vehicle weight and the weight carried by the different axles and to then adjust each auxiliary axle as needed while calculating the vehicle weight on the various axles and though the vehicle with the available auxiliary axles deployed and loaded would appear to be in compliance with the applicable regulations, this could be a costly incorrect assumption.

Various approaches have been offered in addressing some of these challenges including the control system disclosed in U.S. Pat. No. 5,193,063 that is directed at load-transporting vehicles with one auxiliary axle and U.S. Pat. No. 6,371,227 that is directed at load-transporting vehicles with multiple auxiliary axles comprising pusher axles and a trailing axle. And while such control systems have addressed some of the challenges faced, there remains a desire for an automatic auxiliary axle control system that can deploy on actual need one or more auxiliary axles and then control the degree to which they help carry the weight of the vehicle in a manner such that all the axles supporting the vehicle are conditioned in so far as possible to efficiently meeting the operating objectives of the respective axles as well as complying with applicable state and federal law.

SUMMARY OF THE INVENTION

The present invention provides an automatic auxiliary axle control system for load-transporting motor vehicles having two or more primary axles and one or more auxiliary axles wherein the control system is adapted to detect a noncompliant axle carrying weight condition when the weight of the vehicle carried by any one of the primary axles exceeds a prescribed maximum allowable axle carrying weight assigned to that axle and also when the weight carried by a group of the axles arranged consecutively exceeds a prescribed maximum allowable axle group carrying weight assigned to that group. With the control system on the detection of any such noncompliant axle carrying weight condition adapted to effect auxiliary axle usage that results in no maximum allowable axle carrying weight and no maximum allowable axle group carrying weight being exceeded provided the current gross vehicle weight does not exceed a prescribed maximum allowable gross vehicle weight determined by all of the axles and the current center of gravity of the vehicle is located within a certain compliance-manageable range of auxiliary axle usage. And with the control system also adapted to apply state and/or federal law to the maximum allowable axle and axle group carrying weight and gross vehicle weight.

Moreover, the control system is adapted to effect such auxiliary axle usage that results in the weight acting on the supporting axles being not less than a minimum allowable carrying weight assigned thereto and also within an optimum weight carrying range assigned thereto. Furthermore, the control system is adapted to provide optimal auxiliary axle usage based on auxiliary axle availability when the current gross vehicle weight exceeds the maximum allowed and also when the current center of gravity of the vehicle is outside the compliance-manageable range. In addition, the control system is adapted to allow manual control by a vehicle operator over auxiliary usage that can then be relinquished to automatic control if desired with the system then accounting for those auxiliary axles that are under control by the operator and adjusting the remaining auxiliary axles accordingly. And the control system is also adapted to provide information to the vehicle operator regarding certain matters including the status of auxiliary axle operation, the weight on the axles then supporting the vehicle, the gross vehicle weight, whether or not there is compliance with applicable state and federal law, and information that the operator has the ability to address and deal with in an appropriate manner.

These and other features of the invention are disclosed in the accompanying drawings and description of exemplary embodiments of the invention.

DESCRIPTION OF THE DRAWINGS

FIGS. 6-15 are side views of the dump truck in FIG. 1 illustrating sequential operation of the automatic auxiliary axle control system as load is added to the truck.

FIGS. 16-19 are side views of the dump truck in FIG. 1 illustrating when it is not possible to obtain the desired weight distribution between the primary axles and auxiliary axles when the vehicle is loaded such that the existing center of gravity of the vehicle is located outside of a certain manageable range.

FIG. 20 is a side view of another dump truck incorporating the automatic auxiliary axle control system according to the present invention wherein the truck is like that in FIG. 1 but has the operating cylinders of the trailing axle suspension system connected in a different manner with the truck.

FIG. 21 is a side view of a dump truck incorporating the automatic auxiliary axle control system according to the present invention wherein the truck has three pusher axles and two trailing axles that help to support the dump truck.

FIG. 22 is a side view of another dump truck incorporating the automatic auxiliary axle control system according to the present invention wherein the truck has one pusher axle.

FIG. 23 is a side view of a refuse-transporting truck incorporating the automatic auxiliary axle control system according to the present invention wherein the truck has a pusher axle and a tag axle.

FIG. 24 is a side view of another refuse-transporting truck incorporating the automatic auxiliary axle control system according to the present invention wherein the truck has a pusher axle and a trailing axle.

FIG. 25 is a side view of another refuse-transporting truck incorporating the automatic auxiliary axle control system according to the present invention wherein the truck has a pair of axles with steerable wheels and a trailing axle.

FIG. 26 is a side view of a transit-mixer truck incorporating the automatic auxiliary axle control system according to the present invention wherein the truck has a pusher axle and a trailing axle.

FIG. 27 is a side view of a military load-transporting truck incorporating the automatic auxiliary axle control system according to the present invention wherein the truck has a pusher axle.

FIG. 28 is a side view of another military load-transporting truck incorporating the automatic auxiliary axle control system according to the present invention wherein the truck has a tag axle.

FIG. 29 is a side view of an open-bed load-transporting truck incorporating the automatic auxiliary axle control system according to the present invention wherein the truck has a pusher axle and a tag axle.

FIG. 30 is a side view of another open-bed load-transporting truck incorporating the automatic auxiliary axle control system according to the present invention wherein the truck has three pusher axles and two tag axles.

FIG. 31 is a side view of a liquid-transporting truck incorporating the automatic auxiliary axle control system according to the present invention wherein the truck has a pusher axle and a tag axle.

DESCRIPTION OF EXEMPLARY EMBODIMENTS

Figure 1:
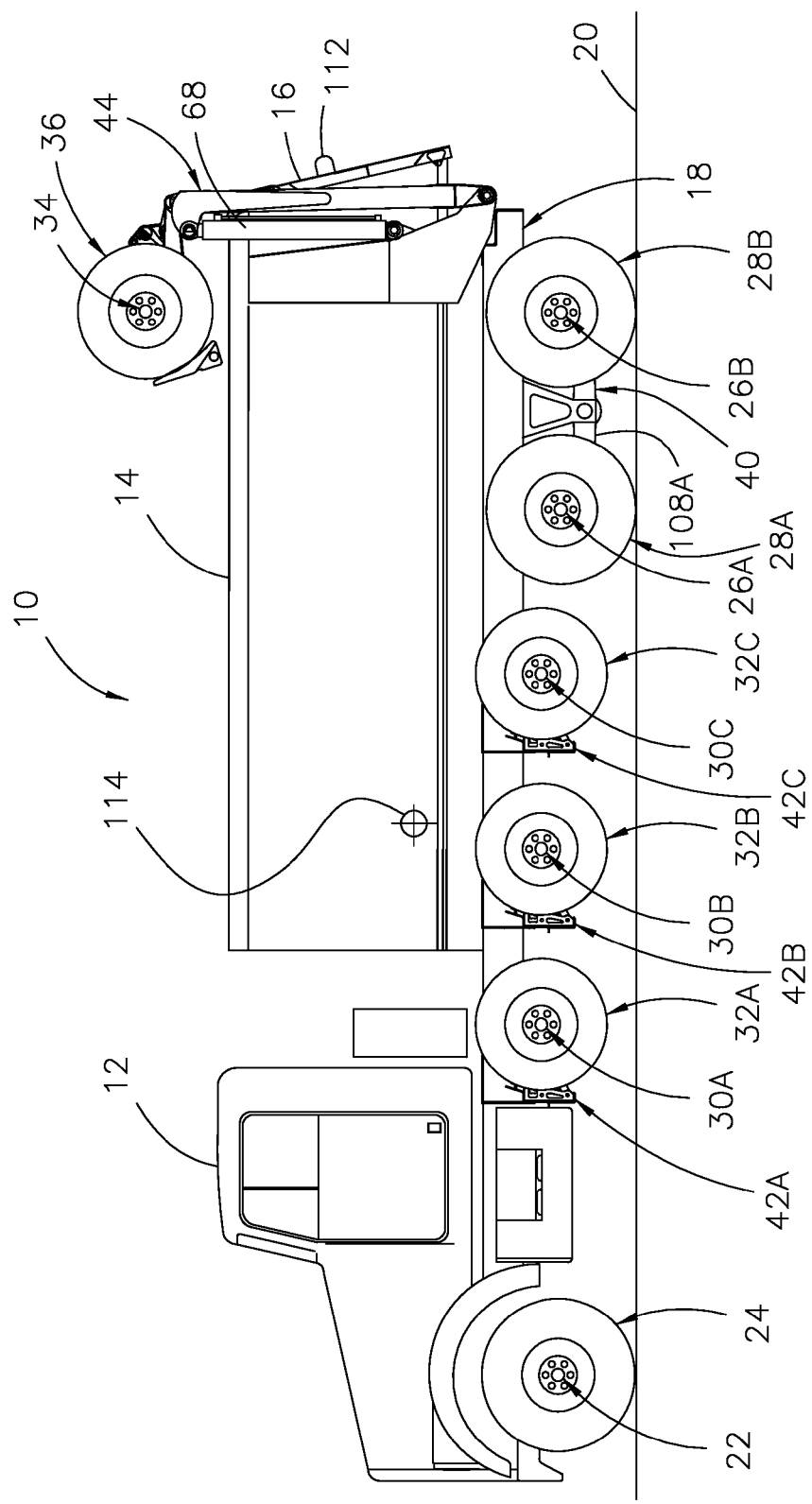
FIG. 1 is a side view of a dump truck incorporating the automatic auxiliary axle control system according to the present invention wherein the truck has primary axles consisting of a front axle and powered tandem axles and auxiliary axles consisting of three pusher axles and a trailing axle that are shown in their stowed condition.

Referring to FIGS. 1-19, the present invention is disclosed as applied to a load-transporting motor vehicle in the form of a dump truck 10 having a cab 12 that serves as a vehicle operator and passenger compartment and a tiltable dump body 14 that serves as a load container and has a tail gate 16 for releasing a load when the dump body is tilted. With the cab and tiltable dump body mounted on a chassis 18 and the chassis in turn supported on a road surface 20 by both primary axles and deployable auxiliary axles. With the primary axles consisting of a forwardly-located axle 22 with steerable wheels 24 and rearwardly-located powered tandem axles 26A and 26B with dual wheels 28A and 28B respectively at their outboard ends. And with the auxiliary axles consisting of three pusher axles 30A, 30B and 30C with wheels 32A, 32B and 32C respectively, and a trailing axle 34 with wheels 36.

And to aid in understanding the important role that the auxiliary axle control system according to the present invention plays in strategically distributing the vehicle weight between all of the supporting axles available in a manner suited to utilizing their contribution to vehicle operation in an advantageous manner, there will now be described their manner of suspension and relationship. Wherein the front axle 22, tandem axles 26A and 26B, pusher axles 30A, 30B and 30C and trailing axle 34 are suspended from laterally spaced locations on the truck chassis 18 by suspension systems 38, 40, 42A, 42B, 42C and 44 respectively. See FIGS. 2-5. With the front axle 22 located beneath the chassis 18 and adjacent the front end thereof and with its wheels 24 pivotally mounted in a conventional manner on the ends of the axle and linked together by a tie rod 46 and steered from the cab with a steering wheel 48 by the vehicle operator acting through a steering gear arrangement (not shown) of a suitable conventional type. Whereas the tandem axles 26A and 26B are located beneath the truck chassis 18 under a rear end-portion of the dump body 14 and are powered and thus their wheels 28A and 28B by a power train of a suitable conventional type that includes an engine and transmission (not shown) that are controlled from the cab by the vehicle operator.

Continuing on with the axle suspension systems, both the front axle suspension system 38 and tandem axles suspension system 40 are parallel leaf-spring suspensions of a suitable conventional type with the tandem axles suspension system being of the walking-beam type that permits the wheels 28A and 28B of the tandem axles to move up and down relative to each other to a significant extent in passing over bumps and depressions in the surface being traveled. And then as to the auxiliary axles, the pusher axles 30A, 30B and 30C are suspended directly from the chassis 18 by their respective suspension systems 42A, 42B and 42C between the front axle 22 and tandem axles 26A and 26B. And the trailing axle 34 is also suspended from the truck chassis 18 but via the dump body 14 and is deployable to operate as shown in FIGS. 7-19 at a significant distance rearward of the rearmost primary axle (axle 26B) that can be 10-13 feet with the trailing axle suspension system 44.

Figure 2:
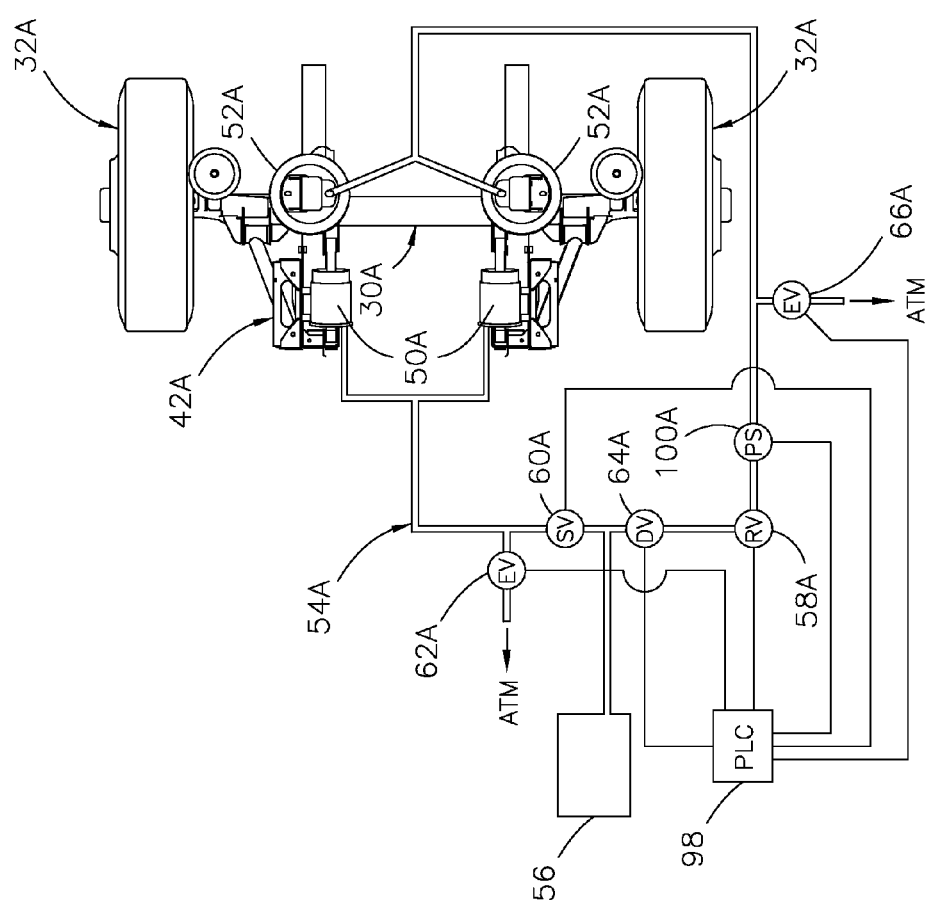
FIG. 2 is an overhead view of one of the pusher axle suspension systems in FIG. 1.
Figure 4:
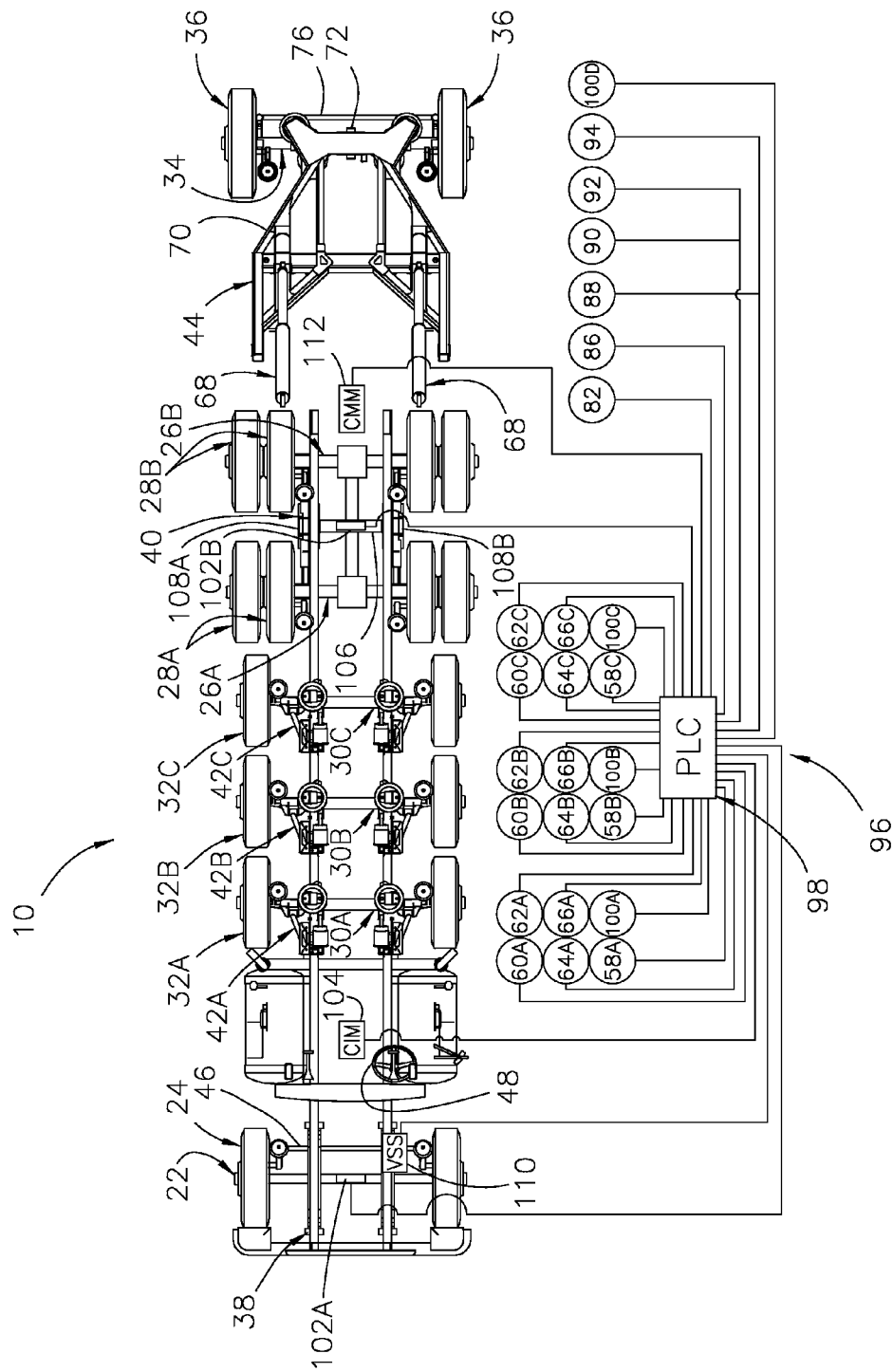
FIG. 4 is an overhead view exposing the axles and associated suspension systems of the truck along with a schematic of the automatic auxiliary axle control system according to the present invention as associated therewith and wherein the trailing axle is shown deployed and a single weight sensor is employed in the powered tandem axles' suspension system.
Figure 5:
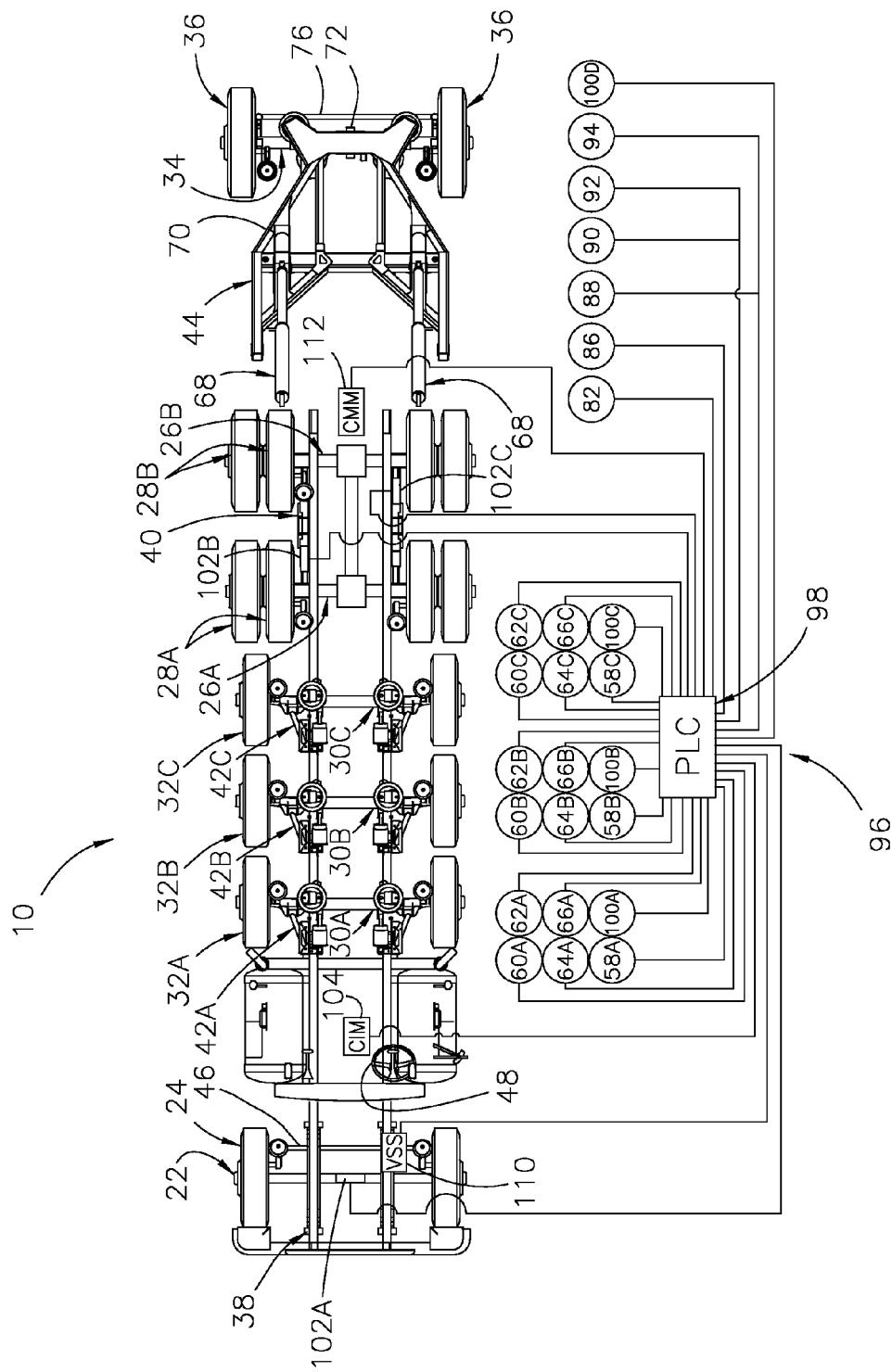
FIG. 5 is like FIG. 4 showing the adaptation of the automatic auxiliary control system wherein two weight sensors are employed in the powered tandem axles suspension system.

Describing now the pusher axle suspension systems 42A, 42B and 42C, they are also of a suitable conventional type with the components associated with the operation of each of the pusher axles shown FIG. 2 with respect to the pusher axle suspension system 42A and with the understanding that such also applies to the corresponding components of the other pusher axle suspension systems 42B and 42C using the same reference numbers but with the suffix letters B and C to the extent they are shown in FIGS. 4 and 5.

As shown in FIG. 2, the pusher axle suspension system 42A includes laterally-spaced axle-stowing pneumatically-controlled cylinders 50A and axle-deploying pneumatically-controlled air springs 52A of the elastomeric bag type under the control of a control circuit 54A that controls the stowing and deploying of the pusher axle 30A and the loading of the axle while deployed. Wherein the control circuit 54A comprises an air pressure accumulator tank 56, a pressure regulator valve (RV) 58A, an axle-stowing valve (SV) 60A and operatively-associated exhaust valve (EV) 62A, and an axle-deploying valve (DV) 64A and operatively-associated exhaust valve (EV) 66A. With the air pressure accumulator tank 56 in addition to supplying air under pressure for the control circuit 54A, also supplying the other pusher axle control circuits 54B and 54C as well as other pneumatically-operated vehicle components and for such purposes is supplied on demand by an engine driven air compressor (not shown) with the pressure maintained in the air tank at a pressure suitable to meet the demands of all the pneumatically-operated systems it serves.

And wherein all of the valves in the control circuit 54A are of a conventional electronically-controlled type with the exhaust valve (EV) 62A when opened exhausting the air pressure downstream of the axle-stowing valve (SV) 60A to the atmosphere (ATM) and the exhaust valve (EV) 66A when opened exhausting the air pressure downstream of the axle-deploying valve (DV) 64A to the atmosphere (ATM). And with the pressure regulator valve 58A being operable to vary the air pressure downstream in accordance with a controlled voltage input as further described later.

Describing now the operation of the pusher axle suspension system 42A that is available with the associated control circuit 54A as thus far described, the pusher axle 30A is established in a stowed inactive condition as shown in FIGS. 1 and 6 by opening the axle-stowing valve 60A while closing the exhaust valve 62A and by closing the axle-deploying valve 64A while opening the exhaust valve 66A. Thereby pressurizing the axle-stowing cylinders 50A and exhausting the axle-deploying air springs 52A of air pressure whereby the cylinders 50A position and hold the pusher axle 30A in the stowed inactive condition while the springs 52A allow such action.

And the pusher axle 30A is deployed and established in an active condition as shown in FIG. 7 by closing the axle-stowing valve 60A while opening the exhaust valve 62A and by opening the axle-deploying valve 64A while closing the exhaust valve 66A. Thereby exhausting the cylinders 50A and pressuring the air springs 52A. Whereby the pusher axle 30A is deployed by the air springs 52A and is then in an active condition wherein the air springs 52A force the pusher axle to accept a portion of the vehicle weight. With the applied force on the pusher axle 30A determined by the regulated air pressure applied to the air springs 52A according to the pressure established by the regulator valve 58 as further described later. And then on subsequent opening of the axle-stowing valve 60A while closing the exhaust 62A valve and by closing the axle-deploying valve 64A while opening the exhaust valve 66A, the pusher axle 30A is returned to its stowed inactive condition in completing the cycle of operation of the pusher axle 30A.

Figure 3:
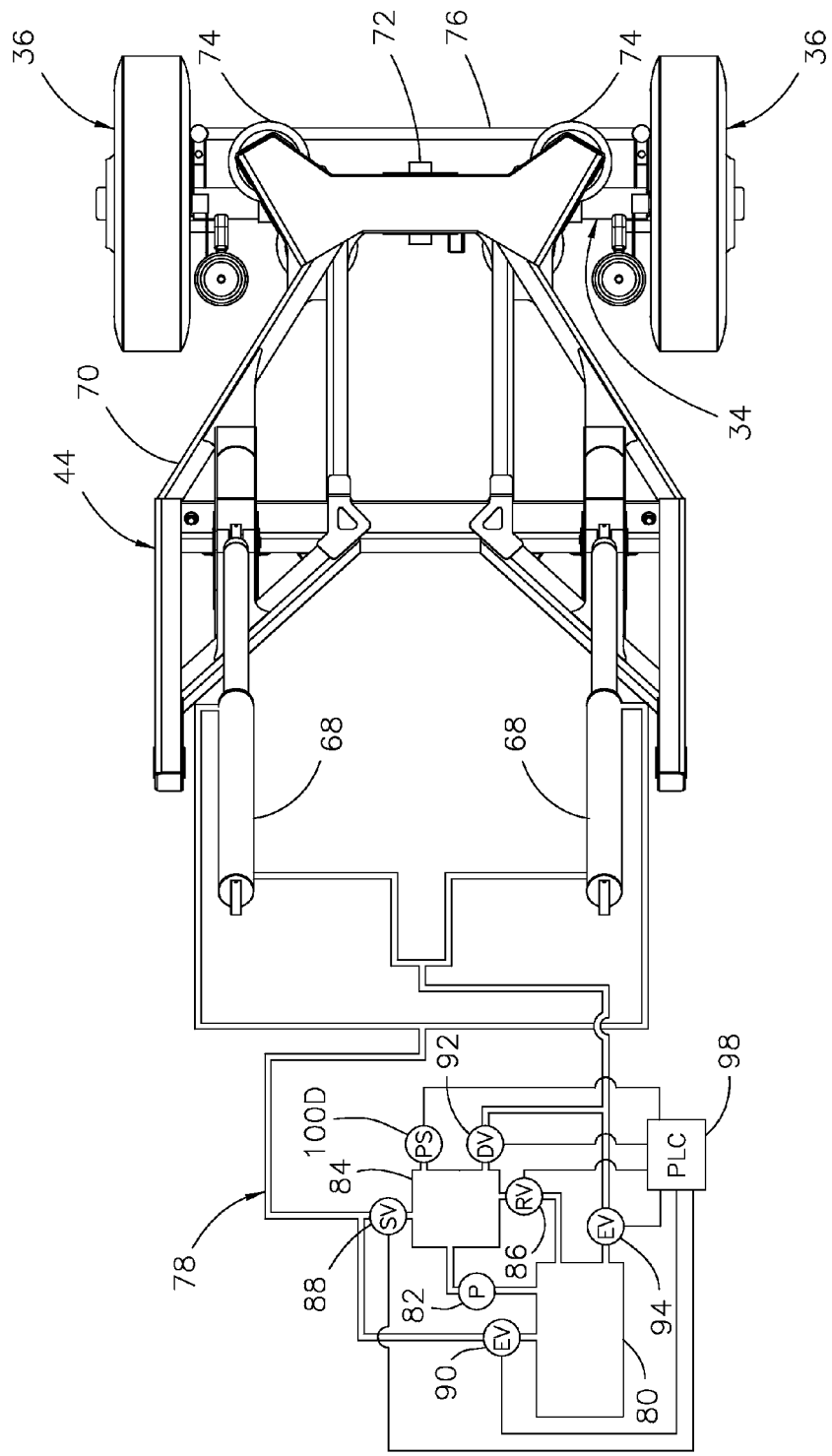
FIG. 3 is an overhead view of the trailing axle suspension system in FIG. 1 with the trailing axle deployed.

Turning now to the trailing axle 34 and referring to FIGS. 1, 3 and 6, the trailing axle suspension system 44 is like that in U.S. Pat. No. 7,775,308 and includes a pair of laterally-spaced hydraulically-operated actuators 68 that incorporate an internal gas spring and are pivotally connected at one end to a carriage 70 and at the opposite end to the dump body 14 and thereby to the chassis 18. And wherein the trailing axle 34 is directly suspended from the carriage 70 with a centrally located pivotal connection 72 and air springs 74 that cushion the pivotal movement allowable of the trailing axle relative to the carriage. Whereby the carriage 70 is pivotally connected to the tiltable dump body 14 and thereby to the truck chassis to provide for the trailing axle to be swung by the actuators 68 between its stowed inactive condition shown in FIG. 1 and its deployed active condition shown in FIG. 7. And with the trailing axle 34 in the active condition, the trailing axle wheels 36 track the turning movement of the truck by being pivotally mounted on the ends of the axle and linked together by a tie rod 76.

The actuators 68 are under the control of a hydraulic circuit 78 as shown in FIG. 3 that comprises a vented hydraulic tank 80, a hydraulic pump (P) 82 that operates on demand, a manifold 84, a hydraulic pressure regulator valve (RV) 86 that returns excess at the manifold to the tank in regulating the pressure being supplied for suspension operation, an axle-stowing valve (SV) 88 and operatively associated exhaust valve (EV) 90, and an axle-deploying valve (DV) 92 and operatively associated exhaust valve (EV) 94. And wherein all of the valves in the control circuit 78 are of a conventional electronically controlled type and with the pressure regulator valve 86 being operable to vary the hydraulic pressure supplied to the actuators 68 in accordance with a controlled voltage input as further described later.

Describing now the operation of the trailing axle suspension system 44 that is available with the hydraulic circuit 78 as thus far described, the trailing axle 34 is established in its stowed inactive condition by opening the axle-stowing valve 88 while closing the exhaust valve 90 and by closing the axle-deploying valve 92 while opening the exhaust valve 94. Whereby the trailing axle is then positioned and held in a stowed inactive condition as shown in FIG. 1. And then on closing the axle-stowing valve 88 while opening exhaust valve 90 and opening the axle-deploying valve 92 while closing exhaust valve 94, the trailing axle 34 is deployed and established in an active condition as shown in FIG. 7. Wherein the trailing axle 34 is then forced to accept a portion of the vehicle weight determined by the regulated pressure established by the regulator valve 86 as further described later. And then on opening the axle-stowing valve 88 while closing the exhaust valve 90 and closing the axle-deploying valve 92 while opening the exhaust valve 94, the trailing axle is returned to its stowed inactive condition.

In addition to what has been described with respect to the various axles, it will also be understood that the front axle wheels 24, tandem axle wheels 28A and 28B, pusher axle wheels 32A, 32B and 32C and trailing axle wheels 36 have conventional air-operated service brakes. Whose braking ability is addressed by the present invention in providing for suitable weights being carried by all of the axles that are supporting the vehicle with added load as further described later.

And to further aid in understanding the challenges faced in efficient use of all the axles, the primary axles typically have a maximum weight carrying capacity substantially greater than that of any of the auxiliary axles, and a trailing axle typically has a weight carrying capacity that is less than that of the primary axles but greater than that of a pusher axle and tag axle. For example and with respect to the dump truck 10, (a) the maximum allowable weight carried by the front axle 22 may be 20,000 pounds as prescribed by federal regulations but also have a minimum allowed carrying weight not less than 14,000 pounds for desired operational effectiveness including steerage and braking as well as vehicle support, (b) the tandem axles 26A and 26B may have a combined maximum allowable carrying weight of 34,000 pounds as prescribed by federal regulations relating to a group of consecutive axles but also have a combined minimum allowable carrying weight not less than 26,000 pounds for desired operational effectiveness including traction and braking as well as vehicle support, (c) the pusher axles 30A, 30B and 30C that are employed may each have a maximum allowable carrying weight of 8,000 pounds but also have a minimum allowable carrying weight not less than 1,500 pounds for desired operational effectiveness including braking as well as vehicle support, and (d) the trailing axle 34 employed may have a maximum allowable carrying weight of 13,000 pounds but also have a minimum allowable carrying weight not less than 2,500 pounds for desired operational effectiveness including braking and vehicle stability as well as vehicle support. And these circumstances are also addressed by the present invention as described later.

Moreover, the weight carried by the front axle 22 and tandem axles 26A and 26B from the standpoint of durability in adequately performing their duty as the primary axles may have an optimum range of carrying weight within the range of their maximum and minimum allowable carrying weights and especially when the weight of the vehicle is approaching a maximum allowable gross vehicle weight determined by the number of axles and their grouping such as when applying state and federal law. Wherein the optimum weight sought to be carried by the front axle 22 and the tandem axles 26A and 26B may be substantially midway of their maximum and minimum allowable carrying weights while the auxiliary axles are maintained within their allowable range of carrying weights. And in the case of multiple auxiliary axles, not all of those available may be required to accomplish this depending on the then existing vehicle weight and the location of the then existing center of gravity of the vehicle. And these circumstances are also addressed by the present invention as described later.

All of the above considerations as well as others of significance are addressed by the present invention in determining auxiliary axle usage and to what extent whether there is only one auxiliary axle or multiple auxiliary axles. And this includes complying with applicable state and federal law when so directed that for example limit the weight on an individual axle to 20,000 pounds and that on a group of two consecutive axles to 34,000 pounds as previously indicated and also limit the gross vehicle weight to a certain weight depending on all of the axles supporting the vehicle including auxiliary axles. And with the ultimate goal of the present invention being to provide optimal auxiliary axle usage in view of the above considerations and that depends on the actual situation having to be dealt with as will become more apparent from the adaptation of the invention to various forms of load-transporting vehicles and their supporting axles.

Describing now the Auxiliary Axle Control System (AAACS) 96 according to the present invention as applied to the dump truck 10 and with reference to FIGS. 2-5, the AAACS utilizes a Programmable Logic Controller (PLC) 98 that is installed in the cab 12 or other readily accessible location on the truck and in the illustrated embodiment is wired as shown to operate the controlling valves in the auxiliary axle suspension systems 42A, 42B, 42C and 44 utilizing (1) certain information provided to the PLC 98 as described later, (2) auxiliary axle loading information provided by electronic pressure sensors (PS) 100A, 100B, 100C and 100D (see FIGS. 2-5), and (3) primary axle loading information provided by weight sensors (WS) 102A and 102B (see FIG. 4) or 102A, 102B and 102C (see FIG. 5). Wherein the pressure sensors 100A, 100B, 100C and 100D are separate from the pressure regulator valves 58A, 58B, 58C and 86 respectively as shown or incorporated therein in providing regulated pressure feedback for their operation in providing the desired pressure to load the respective auxiliary axles 30A, 30B, 30C and 34 and also monitoring of the resulting loading on the respective auxiliary axles as further described later. And wherein the PLC 98 is also linked with a command and informational module (CIM) 104 that is located in the cab 12 and is adapted to receive commands and information from the vehicle operator for transmission to the PLC 98 and receive information for the vehicle operator from the PLC as described later.

The pressure sensors 100A, 100B, 100C and 100D are of a suitable conventional type and are installed in the respective auxiliary axle control circuits 54A, 54B, 54C and 78 at a location so as to provide a voltage output to the PLC 98 representing the pressure acting in the associated air springs or hydraulic actuators. And the PLC 98 then determines the down force that is acting on the associated auxiliary axle while deployed and thereby the weight of the vehicle this auxiliary axle is being forced to carry that is utilized for monitoring as well as regulated pressure control as further described later. And with the pressure sensors (PS) being of the type that transmit their voltage output to the PLC 98 by wire as shown or by wireless transmission.

The weight sensors 102A, 102B and 102C are also of a suitable conventional type with the weight sensor 102A installed between the center of the front axle 22 and an overhead portion of the truck chassis 18 (not shown) so as to detect the weight carried by the front axle and provide a voltage output to the PLC 98 representing this weight. See FIGS. 4 and 5. And with the weight sensor 102B installed between a crossbeam 106 rigidly connecting the walking beams 108A and 108B in the tandem axle suspension system 40 and an overhead portion of the truck chassis 18 (not shown) so as to detect the weight carried by the axles 26A and 26B and provide a voltage output to the PLC 98 representing this weight. See FIG. 4.

Whereas as shown in FIG. 5, the walking beams in the tandem axle suspension system 40 are not rigidly connected and in that case, weight sensors 102B and 102C are installed between the respective walking beams 108A, 108B and overhead portions of the truck chassis 18 so as to detect the weight carried by the tandem axles and provide voltage outputs to the PLC 98 representing these weights that are then averaged by the PLC as programmed in arriving at the weight carried by these axles with this tandem axle suspension arrangement. And like the pressure sensors (PS), the weight sensors (WS) are of the type that transmit their voltage output to the PLC 98 by wire or by wireless transmission for monitoring purposes as well auxiliary axle usage. And with respect to both the weight sensors (WS) and the pressure sensors (PS), it will also be understood that the circuitry of each may include a voltage conditioner that regulates the power to the sensor in a suitable manner and amplifies the voltage output sent from the sensor to the PLC as necessary.

The AAACS 96 also provides for avoiding an object in the path of movement of the auxiliary axles during their stowing and deployment such as could occur at a loading or unloading site. Wherein this is accomplished with the PLC 98 connected to an electronic vehicle speed sensor of a conventional type providing a voltage output representing the forward speed of the vehicle. And in this case is available at the dump truck's existing electronic vehicle speed sensor (VSS) 110 with the PLC connected therewith as shown in FIGS. 4 and 5. And utilizing this vehicle speed-indicating voltage input, the PLC 98 is programmed to effect deployment and loading and also stowing following deployment only when the vehicle is traveling forward and exceeds a relatively low prescribed speed for a prescribed length of time as further described later. And wherein on deployment of any of the auxiliary axles 30A, 30B, 30C and 34, the PLC 98 is programmed to initially down force the deployed auxiliary axle to carry its minimum allowable carrying weight set by the PLC 98 and then increase the down force until the weight it carries reaches that set by the PLC for the auxiliary axles' intended use. And wherein it will be understood that such speed information transmitted to the PLC 98 can be provided by other suitable vehicle speed sensors and transmitted to the PLC by wire or wireless transmission.

In addition to the above control regarding a clear path for trailing axle stowing and deployment, the PLC 98 is also linked to a clearance-monitoring module (CMM) 112 comprising an image sensor and a surveillance camera that are both of a conventional type. Wherein the image sensor is capable of detecting an object that has entered a certain area and the camera is linked to the image sensor so as to provide for remote viewing of the scene by the vehicle operator when such an object is detected by the image sensor. And for example in the case of a trailing axle, the clearance-monitoring module 112 is installed in a suitable position at the rear of the truck such as on the outer side of the tailgate 16 as shown to enable detecting and viewing of an object in the path of the deployment of the trailing axle 34 whether the trailing axle is being operated automatically or under manual control as further described later. And wherein the PLC 98 is programmed on such detection to send information to the vehicle operator via the CIM 104 informing of this condition while preventing trailing axle deployment or ceasing such if underway and then returning the trailing axle to its stowed condition. While the surveillance camera in a coordinated manner also displays the scene on a viewing screen located in the CIM 104 or at some other location in the cab 12 suitable to convenient viewing by the vehicle operator.

Describing now the AAACS 96 in its adaptation to operate in controlling the deployment and the weight carried by the auxiliary axles in a significantly advantageous manner whether there is only one auxiliary axle available or several, it is important to first recognize when there is an actual need for auxiliary axle usage on the addition of a load to the vehicle and then be able to establish with such auxiliary axle usage a weight distribution/apportioning between all of the axles then supporting the vehicle in a highly efficient manner based on auxiliary axle availability. Such that the weight then carried by the primary axles whenever possible does not exceed their maximum allowable carrying weight and when required to do so is minimized to the extent possible with the maximum allowable axle carrying weight of the available auxiliary axle(s). And when both the primary axles and auxiliary axles also have a minimum allowable carrying weight for reasons of overall performance, the difficulty in providing effective auxiliary axle usage increases significantly and especially where it is desired to optimize the weight carried by the primary axles. And in considering how to efficiently manage auxiliary axle usage, it is important to recognize that the center of gravity of the vehicle plays an important factor in that it can shift longitudinally of the vehicle to a significant extent with the addition of a load from the location that exists with the vehicle unladen. And in the case of the dump truck 10, its center of gravity 114 without a load is located as shown in FIG. 1 and will relocate rearwardly and upwardly as load is added and thereby shift the weight carried by the primary axles accordingly.

In arriving at the present invention, it was found that the ability to provide significantly advantageous auxiliary axle usage is dependent on the vehicle's existing center of gravity residing in a compliance-manageable range A as shown with respect to the dump truck 10 in FIGS. 6-19 and shown in FIGS. 20-32 with respect to other load-transporting vehicles later described. Wherein the compliance-manageable range A is determined by (a) the current gross vehicle weight, (b) the maximum allowable carrying weight of each primary axle that has a prescribed maximum allowable carrying weight, (c) the minimum allowable carrying weight of each primary axle that has a prescribed minimum allowable carrying weight, (d) the maximum allowable axle group carrying weight of each axle group that has a prescribed maximum allowable carrying weight, (e) the minimum allowable axle group carrying weight of each axle group that has a prescribed minimum allowable axle group carrying weight, (f) the maximum allowable carrying weight of each auxiliary axle that has a prescribed maximum allowable carrying weight, (g) the minimum allowable carrying weight of each auxiliary axle that has a prescribed minimum allowable carrying weight, and (h) the distance of each primary axle and each auxiliary axle from a fixed datum point on the vehicle such as on the centerline of the front axle as shown or some other suitable location on the vehicle including the vehicle chassis. And wherein the width of the compliance-manageable range A that results from such determination is defined by the range-bordering distances B and C from the datum point that is on the centerline of the front axle in all the exemplars.

And in considering the application of the compliance-manageable range A as utilized by the present invention, it was also recognized (a) that the wider the range of acceptable primary axle carrying weights, the wider the compliance-manageable range A, (b) that the compliance-manageable range A narrows as the gross vehicle weight approaches the maximum allowable, (c) that the larger the number of auxiliary axles available, the wider the compliance-manageable range A, and (d) that the wider the range of allowable auxiliary axle carrying weights, the greater the flexibility in manipulating the weight distribution between all of the supporting axles in the most suitable manner as further described later.

In preparing the Automatic Auxiliary Axle Control System (AAACS) 96 to perform in the manner afforded by the present invention, the information listed below is provided to the AAACS 96 via the PLC 98. That is then utilized by the programming of the PLC 98 described later in carrying out the desired automatic auxiliary usage and also providing for manual control over auxiliary axle usage.

Information Provided to the PLC 98
1. The number of primary axles.
2. The distance of each primary axle from a fixed datum point on the vehicle.
3. The maximum allowable carrying weight of each primary axle if federal or state laws are not to be applied.
4. The number of auxiliary axles.
5. The distance of each auxiliary axle from the fixed datum point.
6. The maximum allowable carrying weight of each auxiliary axle.
7. Designation of any group of auxiliary axles that are jointly stowed, deployed and loaded.
8. The operating pressure-forced axle loading relationship for each auxiliary axle consisting of at least two distinct operating pressure values for the axle's operating devices (air springs or hydraulic cylinders) and the corresponding resulting weights on the auxiliary axle for each pressure value. And for auxiliary axles that do not have a linearly proportional relationship between the operating pressure and weight on the axle, it is to be understood that more entries will increase the accuracy provided.
9. The maximum allowable gross vehicle weight if the applicable federal or state laws are not to be applied.
10. The current vehicle weight on each of the primary axles.
11. The current vehicle forward speed.
12. The applicable state law or associated table of weight limitations if to be applied.
13. The applicable federal law or associated table of weight limitations if to be applied.
14. The minimum allowable carrying weight of each primary axle if to be applied.
15. The minimum and maximum optimum carrying weight of each primary axle if to be applied.
16. The minimum and maximum allowable carrying weight for any certain group of consecutive primary and/or deployed auxiliary axles if to be applied.
17. The minimum and maximum optimum carrying weight for any group of consecutive primary and/or deployed auxiliary axles if to be applied.
18. The minimum allowable carrying weight of each auxiliary axle if to be applied.
19. The maximum time required to deploy each auxiliary axle.
20. The minimum gross vehicle weight for auxiliary axle deployment if to be applied.
21. Weight scale devices that are connected to the system to deliver vehicle weight information electronically.
22. The current fluid pressure acting to load a deployed auxiliary axle.
23. An image detecting sensor detecting the presence of an object in the path of operation of an auxiliary axle.
24. A surveillance camera linked with the image detecting sensor.
25. The vehicle operator specified manual deployment state (stowed or deployed) of any auxiliary axles if to be applied.
26. The vehicle operator specified manual loading of any auxiliary axles if to be applied.

As to current weight information supplied to the PLC 98, it will be understood that in the absence of onboard weight sensors or some other form of onboard means for detecting the current weight being carried by the primary axles, such weight information can be provided with the use of platform weight scales at a weighing station and entered by the vehicle operator and also portable scales placed under their wheels and transmitted by wire or wireless to the PLC 98 or entered by the vehicle operator. Or the current weight information regarding the primary axles can be provided by suitable onboard weight sensors added in adapting the AAACS 96 to a vehicle. As demonstrated with the dump truck 10 in the installation of the weight sensors 102A, 102B and 102C with respect to the primary axles along with that of the pressure sensors 100A, 100B, 100C and 100D with respect to the auxiliary axles in supporting the operational capability of the AAACS.

Describing now the operation provided by the AAACS 96 employing the above-listed information supplied to the PLC 98, the PLC when activated by the vehicle operator at the CIM 104 is programmed to perform the following numbered tasks listed below with regard to auxiliary axle usage (deployment with forced loading) when there are two or more primary axles and one or more auxiliary axles. And with the understanding that a group of consecutive axles (GCA) is any group of consecutive primary and/or deployed auxiliary axles, and in considering every possible combination of the deployed auxiliary axles, a particular vehicle may have many GCAs. And that the maximum gross vehicle weight is considered the maximum allowable gross vehicle weight of the GCA determined by all of the vehicle's axles.

Tasks Performed by the PLC 98

1. If federal or state law is to be applied, ensure that no axle or group of consecutive axles (GCA) has a maximum allowable carrying weight that exceeds the limit set forth by the applicable law in the manner that follows:
    a. If federal law is to be applied, determine the maximum allowable weight for any primary axle, auxiliary axle, or GCA on the vehicle based on the distances between all of the axles on the vehicle and the federal law or associated table of limitations.
    b. If state law is be applied, determine the maximum allowable weight for any primary axle, auxiliary axle, or GCA on the vehicle based on the distances between all of the axles on the vehicle and the state law or associated table of limitations.
    c. For every primary axle, auxiliary axle, and GCA on the vehicle that has a federally-mandated maximum allowable weight or state-mandated maximum allowable weight or a user-prescribed maximum allowable weight, set its effective maximum allowable weight (EMAW) to the lowest of:
        i. The federally-mandated maximum allowable weight if it is to be applied.
        ii. The state-mandated maximum allowable weight if it is to be applied.
        iii. A system user prescribed maximum allowable weight.
2. If federal law and state law are not to be applied, for each primary axle, auxiliary axle, and GCA on the vehicle that has a prescribed maximum allowable weight, set its EMAW to its prescribed maximum allowable weight.
3. If the minimum Vehicle Weight for auxiliary axle Deployment (VWD) is not prescribed, set it to zero.
4. Immediately accept current vehicle weight information that is manually entered in the system.
5. On receiving current vehicle weight information that is not manually entered in the system, send a signal indicating that vehicle weight information is being received but is not yet accepted, and accept such vehicle weight information only if:
    a. The vehicle is currently stationary and has remained stationary for at least 5 seconds, and if so, accept the weight data immediately.
    b. Or the vehicle weight information is received at least 5 separate and distinct times in a 5 second interval and the information does not deviate more than 1% over that 5 second interval, and accept the current vehicle weight as the mean of the information received over the time interval when the time interval passes.
6. Upon accepting current vehicle weight information, send a signal indicating such and determine the current vehicle weight with all auxiliary axles stowed (WAAS) at each of the primary axles, accounting for the weight on any auxiliary axles that are currently deployed, and the location of the center of gravity of the vehicle (COGV) with respect to the fixed datum point according to the vehicle information provided.
7. For any primary axle, auxiliary axle, or GCA that has an EMAW, establish for that axle or GCA an allowable weight-carrying range (AWCR) that spans from the prescribed minimum allowable weight to the associated EMAW for that particular axle or GCA. For any such axle or GCA lacking a prescribed minimum allowable weight, use a weight of zero for the minimum in establishing the AWCR.
8. For any primary axle, auxiliary axle, or GCA that has a prescribed maximum optimum weight, establish for that axle or GCA an optimum weight carrying range (OWCR) that spans from the prescribed minimum optimum weight to the associated prescribed maximum optimum weight for that particular axle or GCA. For any such axle or GCA lacking a prescribed minimum optimum weight, the minimum weight used to establish its OCWR is its prescribed minimum allowable weight if a minimum allowable weight has been prescribed or zero if a minimum allowable weight has not been prescribed.
9. Account for vehicle operator manual override control of any auxiliary axle wherein the vehicle operator can manually deploy or stow an auxiliary axle and thereby establish that auxiliary axle in a manual deployment mode, and/or the vehicle operator can manually specify the weight to be carried by any auxiliary axle within its AWCR and thereby establish the auxiliary axle in a manual loading mode.
10. Account for any auxiliary axle established in a manual deployment mode and no longer having a vehicle operator manual deployment state, wherein the axle is disestablished from a manual deployment mode and returned to normal system deployment functionality, and any auxiliary axle that is established in a manual loading mode and no longer having a vehicle operator specified weight to be carried, wherein the axle is disestablished from manual loading mode and returned to normal system loading functionality.
11. Account for any group of auxiliary axles that are designated as being jointly stowed, deployed and loaded wherein all axles in the group must be deployed or all axles in the group must be stowed and when the axles in the group are deployed they must all be loaded substantially equally as follows:
    a. If any axle in the group is established in a manual deployment mode then all other axles in the group are also established in that same manual deployment mode.
    b. If no axles in the group are established in a manual deployment mode then possible combinations of auxiliary axle deployment to be considered by the system must include all of the axles in the group being deployed or all of the axles in the group being stowed.
    c. If any axle in the group is established in a manual loading mode then all other axles in the group are also established in a manual loading mode at the same load amount.
    d. If no axles in the group are established in a manual loading mode then possible combinations of auxiliary axle loading to be considered by the system must include all of the axles in the group being loaded equally.
12. On detecting that the current vehicle weight exceeds the VWD, determine auxiliary axle necessity when the WAAS at any primary axle is outside its AWCR and when the WAAS at any group of consecutive primary axles has an AWCR that is outside its AWCR.
13. On detecting that the current vehicle weight does not exceed the VWD or that there is no auxiliary axle necessity, send a signal indicating that no auxiliary axle deployment is deemed necessary, and:
    a. Enable all auxiliary axles for stowing that are not in a specified deployment mode.
    b. For any auxiliary axles that are in a specified deployment mode, enable them for deployment or stowing as specified by the operator.
    c. For any auxiliary axle specified by the operator to be deployed but not in a specified loading mode, enable that axle for loading at its prescribed minimum allowable carrying weight.
    d. For any auxiliary axle specified by the vehicle operator to be deployed and also in a specified loading mode, enable that axle for loading as specified by the vehicle operator.
    e. If one or more auxiliary axles are enabled for deployment, determine the resulting weight carried by the primary axles and any subsequent GCA with those auxiliary axles deployed and loaded as enabled.
14. On detecting auxiliary axle necessity, determine the center of gravity manageable range (COGMR) that is the range of distance from the fixed point within which the COGV can be located such that auxiliary axle usage will result in all axles and GCAs having AWCRs being loaded within their AWCRs. Wherein the COGMR is calculated based on the current vehicle weight, the distances between all of the axles on the vehicle, and the AWCRs of all axles and GCAs that have AWCRs.
15. On detecting auxiliary axle necessity and that the current COGV is located within the COGMR, considering every possible combination of auxiliary axle deployment, determine qualifying acceptable combination(s) (QAC) of auxiliary axles for deployment such that when the combination is deployed and loaded:
    a. Each deployed auxiliary axle is loaded within its AWCR.
    b. The resulting weight carried by each primary axle is within its AWCR.
    c. The resulting weight carried by any subsequent GCA that has an AWCR is within its AWCR.
16. When multiple QACs exist, determine the QACs that would deploy the fewest auxiliary axles and disqualify all others.
17. When one or more QACs exist, and any primary axle or GCA has an OWCR:
    a. For each QAC determine its optimal loading of the auxiliary axles to be deployed in the QAC such that:
        i. Each deployed auxiliary axle is loaded within its AWCR.
        ii. The vehicle degree of optimal loading (VDOL) is maximized, wherein:
            1. For any primary axle or GCA having an OWCR, its degree of optimal loading (DOL) is calculated as follows when the resulting weight on the axle or GCA is outside its OWCR:

$$DOL = \frac{-|W_{RA} - W_{NEO}|}{W_{NEO}}$$

Where:
$W_{RA}$=the resulting weight on the primary axle or GCA.
$W_{NEO}$=the extreme end (minimum or maximum) weight value of the OWCR for the axle or GCA that is nearest the $W_{RA}$.

2. For any primary axle or GCA having an OWCR, its degree of optimal loading (DOL) is calculated as follows when the resulting weight on the axle or GCA $$DOL = \frac{|W_{RA} - W_{NEO}|}{W_{NEO}}$$

is within its OWCR:
Where again:
$W_{RA}$=the resulting weight on the primary axle or GCA.
$W_{NEO}$=the extreme end (minimum or maximum) weight value of the OWCR for the axle or GCA that is nearest the $W_{RA}$.

3. The VDOL=the minimum DOL of all primary axles and GCAs having a DOL.

b. If multiple QACs exist, filter the QACs in this order until one QAC remains:
   i. With each QAC having its optimal loading as determined above, find the QAC that has the maximum VDOL of all the QACs and disqualify all QACs in which the VDOL is less than this maximum.
   ii. Determine from the remaining QACs those that result in the highest DOL at the forward-most primary axle and disqualify all others.
   iii. Determine from the remaining QACs those that do not deploy the rear-most auxiliary axle and disqualify all others.
   iv. Arbitrarily select one from the QACs that remain.

18. When one or more QACs exist, and no primary axle or GCA has an OWCR:
   a. For each QAC determine its most acceptable loading of the auxiliary axles to be deployed in the QAC such that:
      i. Each deployed auxiliary axle is loaded within its AWCR.
      ii. The vehicle degree of acceptable loading (VDAL) is maximized, where:
         1. For any primary axle or subsequent GCAs having an AWCR, its degree of acceptable loading (DAL) is determined as follows:

$$DAL = \frac{|W_{RA} - W_{NEA}|}{W_{NEA}}$$

Where:
$W_{RA}$=the resulting weight on the primary axle or GCA.
$W_{NEA}$=the extreme end (minimum or maximum) weight value of the AWCR for the axle or GCA that is nearest the $W_{RA}$.
         2. VDAL=the minimum DAL of all primary axles and GCAs having a DAL.
   b. If multiple QACs exist, filter the remaining QACs in this order until one QAC remains:
      i. With each QAC having its most acceptable loading as determined above, find the QAC that has the maximum VDAL of all QACs and disqualify all QACs in which the VDAL is less than this maximum.
      ii. Determine from the remaining QACs those that result in the highest DAL at the forward-most primary axle and disqualify all others.
      iii. Determine from the remaining QACs those that do not deploy the rear-most auxiliary axle and disqualify all others.
      iv. Arbitrarily select one from the QACs that remain.

19. When one QAC exists, and no auxiliary axles have been established in a manual deployment mode and no auxiliary axles have been established in manual-loading mode, enable the auxiliary axles for deployment, stowing, and loading according to the QAC and the optimal loading or most acceptable loading as determined in steps 17 and 18.

20. When auxiliary axle necessity has been detected and the current COGV is located outside the COGMR or the current vehicle weight exceeds the prescribed maximum allowable gross vehicle weight (no QAC exists):
   a. Considering every possible combination of auxiliary axle deployment, with each being an unacceptable deployment combination (UDC), determine the least unacceptable loading for each such that when the combination is deployed and loaded:
      i. Each deployed auxiliary axle is loaded within its AWCR.
      ii. The vehicle degree of unacceptable loading (VDUL) is minimized, where:
         1. For any primary axle or GCA having an AWCR wherein the resulting weight is outside its AWCR, its degree of unacceptable loading (DUL) is determined as follows:

$$DUL = \frac{|W_{RA} - W_{NEA}|}{W_{NEA}}$$

Where:
$W_{RA}$=the resulting weight on the axle or GCA.
$W_{NEA}$=the extreme end (minimum or maximum) weight value of the AWCR for the axle or GCA that is nearest the $W_{RA}$.
         2. Determine the vehicle degree of unacceptable loading (VDUL) as follows:

$$VDUL = D_{UMax} + \frac{[0.05(N-1)]}{(N)}$$

Where:
$D_{UMax}$=the maximum DUL value of all primary axles and GCAs that have DULs.
N=the number of primary axles and GCAs having DULs.
   b. When multiple UDCs exist, filter the UDCs in this order until one UDC remains:
      i. With each UDC having its least unacceptable loading as determined above, find the UDCs that result in the lowest VDUL and disqualify all others.
      ii. Determine from the remaining UDCs the minimum DUL for any primary axles or GCAs that have DULs, and disqualify all UDCs in which the lowest of the DULs resulting from the UDC is greater than this minimum.
   iii. Determine from the remaining UDCs the UDC that results in the least number of auxiliary axles being deployed, and disqualify all others.
   iv. Determine from the remaining UDCs the UDC that results in the minimum DUL at the forward-most primary axle, and disqualify all UDCs that result in the forward-most primary axle having a higher DUL than this minimum.
   v. Arbitrarily select one from the UDCs that remain.
  c. Determine the vehicle loading cause of unacceptability (VLCU):
   i. If the current vehicle weight exceeds the prescribed maximum allowable gross vehicle weight, the vehicle is overloaded.
   ii. If the COGV is located outside the COGMR and is located forward of the COGMR, the vehicle is loaded too far forward.
   iii. If the COGV is located outside the COGMR and is located rearward of the COGMR, the vehicle is loaded too far rearward.
   iv. Identify that the VLCU indicates that the vehicle is overloaded and/or the vehicle is loaded too far rearward or too far forward.
21. When one UDC exists, and no auxiliary axles have been established in a manual deployment mode and no auxiliary axles have been established in a manual loading mode, enable the auxiliary axles for stowing, deploying and loading according to the UDC and its least unacceptable loading as determined in step 20.
22. When auxiliary axle necessity has been detected and one or more auxiliary axles have been established in a manual deployment mode or one or more auxiliary axles have been established in a manual loading mode:
  a. Determine alternate qualifying acceptable combination(s) (AQAC) in the same manner as the QACs in step 15 except with these additional requirements:
   i. Any auxiliary axle that has been manually deployed must remain deployed.
   ii. Any auxiliary axle that has been manually stowed must remain stowed.
   iii. Any auxiliary axle that has been manually specified a loading, if to be deployed, must be loaded as manually specified.
  b. When multiple AQACs exist, determine the AQACs that would deploy the fewest auxiliary axles and disqualify all others.
  c. When one or more AQACs exist, and any primary axle or GCA has an OWCR, for each AQAC determine its optimum loading and filter to one combination as was performed for the QACs in step 17, except with these additional requirements:
   i. Any auxiliary axle that has been manually deployed must remain deployed.
   ii. Any auxiliary axle that has been manually stowed must remain stowed.
   iii. Any auxiliary axle that has been manually specified a loading, if to be deployed, must be loaded as manually specified.
  d. When one or more AQACs exist, and no primary axle or GCA has an OWCR, for each AQAC determine its most acceptable loading and filter to one combination as was performed for the QACs in step 18, except with these additional requirements:
   i. Any auxiliary axle that has been manually deployed must remain deployed.
   ii. Any auxiliary axle that has been manually stowed must remain stowed.
   iii. Any auxiliary axle that has been manually specified a loading, if to be deployed, must be loaded as manually specified.
  e. When one AQAC exists, enable the auxiliary axles for stowing, and loading according to the AQAC and its optimal loading or most acceptable loading as determined insteps 22c and 22d.
  f. When no AQAC exists, determine alternate unacceptable deployment combination(s) (AUDCs) and their least unacceptable loading and filter to one combination in the same manner as the UDCs in step 20, except with these additional requirements:
   i. Any auxiliary axle that has been manually deployed must remain deployed.
   ii. Any auxiliary axle that has been manually stowed must remain stowed.
   iii. Any auxiliary axle that has been manually specified a loading, if to be deployed, must be loaded as manually specified.
  g. When one AUDC exists, enable the auxiliary axles for deployment, stowing, and loading according to the AUDC and its least unacceptable loading as determined in step 22f.
23. For each auxiliary axle that is enabled for deployment and loading, determine the target air pressure or hydraulic pressure of the axle's operating device(s) corresponding to the enabled loading, based on the operating pressure-forced axle loading relationship provided for that auxiliary axle:
  a. If the enabled loading of the auxiliary axle equals one of the values in the operating pressure/axle loading relationship provided, set the target pressure for that auxiliary axle at the operating pressure corresponding to that weight value.
  b. If the enabled loading of the auxiliary axle is between two prescribed weight values in the operating pressure-forced axle loading relationship, scale the pressure linearly between the two corresponding pressures to determine the target pressure.
  c. If the enabled loading of the auxiliary axle is not between two prescribed weight values in the operating pressure-forced axle loading relationship, scale the pressure linearly between the two prescribed weight values that are nearest the enabled loading to determine the target pressure.
24. When all auxiliary axles enabled for deployment are currently deployed, all auxiliary axles enabled for stowing are currently stowed, and any currently deployed auxiliary axle is enabled to be loaded differently than it is currently loaded, perform the loading of the axles as enabled immediately.
25. When any auxiliary axles are enabled for deployment that are not currently deployed, or any auxiliary axles are enabled for stowing that are not currently stowed, send a signal to the vehicle operator indicating that auxiliary axle deployment change is necessary, and perform the stowing, deployment and loading of the axles as enabled only when:
  a. The vehicle operator requests immediate deployment change.
  b. Or when the vehicle is travelling forward at a speed greater than 5 mph for 5 seconds.

c. Or for any auxiliary axle having a clearance sensor that is enabled for deployment and is not currently deployed, the clearance sensor indicates that the path for deployment is clear.
26. In performing deployment of an auxiliary axle that was not deployed previously, determine when it is fully deployed and its tires are in contact with the road surface by the air pressure or hydraulic pressure operating on the auxiliary axle or the time for full deployment of the auxiliary axle being exceeded.
27. In performing deployment of an auxiliary axle that was not deployed previously and is not yet determined to be fully deployed, send a signal to the vehicle operator indicating that the axle is being deployed.
28. In performing deployment of an auxiliary axle that was not deployed previously and is not yet determined to be fully deployed, and the performing of deployment was not requested by the vehicle operator, and the vehicle ceases travelling forward at a speed greater than 5 mph or the clearance sensor for the auxiliary axle, if one exists, indicates that the path for deployment is no longer clear:
   a. Immediately stow the axle and send a signal to the vehicle operator indicating that deployment was cancelled due to deployment conditions not remaining satisfied.
   b. If an auxiliary axle's clearance sensor indicates that the path for deployment is not clear and a camera is available that shows the deployment area, display the camera view to the vehicle operator.
29. In performing deployment of an auxiliary axle that was not deployed previously and is determined to be fully deployed, send a signal indicating that the axle is fully deployed.
30. In performing the stowing of an auxiliary axle that was not previously stowed, send a signal indicating such.
31. When all auxiliary axles enabled for stowing are stowed and all auxiliary axles enabled for deployment are fully deployed, and the loading on all auxiliary axles enabled for deployment are loaded as enabled, send a signal indicating such and:
   a. Indicate which primary axles and GCAs, if any, are then loaded within their AWCR.
   b. Indicate which primary axles and GCAs, if any, are then loaded within their OWCR.
   c. Indicate which primary axles and GCAs, if any, are then loaded outside their AWCR.
   d. If a UDC exists, indicate the VLCU.
   e. If an AQAC exists and any primary axles or GCAs have OCWRs, and the VDOL of the AQAC is less than the VDOL of the QAC, indicate that auxiliary axle(s) being established in a manual deployment mode or manual loading mode cause less optimal weight redistribution than would be achievable otherwise.
   f. If an AUDC exists and a QAC exists, indicate that auxiliary axle(s) being established in a manual deployment mode or manual loading mode cause unacceptable weight redistribution when otherwise acceptable weight redistribution would be achievable.
   g. If an AUDC exists and a UDC exists, and the VDUL of the AUDC is greater than the VDUL of the UDC, indicate that auxiliary axle(s) being established in a manual deployment mode or manual loading mode cause unacceptable loading to a greater degree than be achievable otherwise.

From the above programming, it will be observed that the Automatic Auxiliary Axle Control system (AAACS) 96 is adapted to detect a noncompliant axle carrying weight condition when the weight of the vehicle acting on any of the primary axles exceeds a prescribed maximum allowable axle carrying weight assigned to that axle and also when the weight acting on a group of the axles arranged consecutively exceeds a prescribed maximum allowable axle group carrying weight assigned to that axle group. And the AAACS on detecting the noncompliant axle carrying weight condition is adapted to effect auxiliary axle usage encompassing stowing, deploying and loading that results in no maximum allowable axle carrying weight and no maximum allowable axle group carrying weight being exceeded provided the current gross vehicle weight does not exceed a prescribed maximum allowable gross vehicle weight determined by all of the axles and the current center of gravity of the vehicle is located within the compliance-manageable range as defined. Furthermore, the programming provides for the AAACS effecting auxiliary axle usage that results in the weight on any primary axle and axle group not being less than a prescribed minimum allowable axle carrying weight that has been assigned thereto. Furthermore, the programming provides for the AAACS effecting auxiliary usage that results in the weight on any primary axle and axle group being within a prescribed optimum weight carrying range that has been assigned.

Moreover, it will be observed that the AAACS is also adapted to detect a noncompliant axle carrying weight condition when the current gross vehicle weight exceeds a prescribed maximum allowed gross vehicle weight and the current center of gravity of the vehicle is located within the compliance-manageable range and also when the current gross vehicle weight exceeds or is less than the prescribed maximum allowed gross vehicle weight and the current center of gravity is located outside the compliance-manageable range. And the AAACS on detecting any such noncompliant axle carrying weight condition is adapted to effect auxiliary axle usage such that any resulting noncompliant weight is minimized to a prescribed degree. And it will also be observed that the AAACS 96 in addition to such detection and effecting auxiliary axle usage provides the following useful information for the vehicle operator via the Command and Informational Module (CIM) 104.

Information Provided by the PLC 98
1. Indication that current vehicle weight information is being received but not yet accepted.
2. Indication that current vehicle weight information has been accepted.
3. The current deployment state of every auxiliary axle.
4. The current fluid pressure and resulting carrying weight corresponding to that fluid pressure of any auxiliary axle that is currently deployed.
5. The current weight carried at each of the primary axles.
6. Notification that auxiliary axle deployment change has been determined necessary.
7. Notification that an auxiliary axle is being deployed but is not yet fully deployed.
8. Notification that an auxiliary axle is fully deployed.
9. Notification that an auxiliary axle has been stowed.
10. Notification that deployment of one or more auxiliary axles was cancelled because the conditions for deployment were no longer satisfied.

11. When an auxiliary axle deployment is cancelled due to an object being detected and a camera is available, display the camera for viewing.
12. Notification that all auxiliary axles are currently stowed, or deployed and loaded, as determined by the system (no further change is necessary at this time).
13. Indication of whether an axle or GCA is loaded within its OWCR, or else is loaded within its AWCR, or else is loaded outside its AWCR.
14. VCULs, or the reason(s) why any axle or GCA is loaded outside its AWCR (vehicle overloaded or loaded too far rearward or forward).
15. Notification that one or more auxiliary axles being in a manual deployment state and/or manual loading state is causing unacceptable loading when acceptable loading would be achievable otherwise.
16. Notification that one or more auxiliary axles being in a manual deployment state and/or manual loading state is causing less optimal loading than would be achievable otherwise.
17. Notification that one or more auxiliary axles being in a manual deployment state and/or manual loading state is causing a greater degree of unacceptable loading than would be achievable otherwise.

Using the truck 10 as exemplary of the application of the AAACS 96 to load-transporting motor vehicles in general having one or more auxiliary axles and with reference to FIGS. 1-19, there will now be described the auxiliary axle usage that is provided by the AAACS on the addition of load. Wherein the relevant information provided to the PLC 98 for the dump truck 10 is listed below.

Information Provided for the Dump Truck 10
1. The maximum allowable carrying weight on the front axle 22 is 20,000 pounds.
2. The minimum allowable carrying weight on the front axle 22 is 14,000 pounds.
3. The maximum optimum weight on the front axle 22 is 18,000 pounds.
4. The minimum optimum weight on the front axle 22 is 16,000 pounds.
5. The maximum allowable weight on the tandem axles 26A and 26B as a group is 34,000 pounds.
6. The minimum allowable weight on the tandem axles 26A and 26B as a group is 26,000 pounds.
7. The maximum optimum weight on the tandem axles 26A and 26B as a group is 32,000 pounds.
8. The minimum optimum weight on the tandem axles 26A and 26B as a group is 28,000 pounds.
9. The maximum allowable weight on each of the pusher axles 30A, 30B and 30C is 8,000 pounds.
10. The minimum allowable weight on each of the pusher axles 30A, 30B and 30C is 1,500 pounds.
11. The maximum allowable weight on the trailing axle 34 is 13,000 pounds.
12. The minimum allowable weight on the trailing axle 34 is 2,500 pounds.
13. The minimum gross vehicle weight for auxiliary axle deployment is 50,000 pounds.
14. The applicable federal law is to be applied.

Describing now examples of the operation of the AAACS 96 with respect to auxiliary axle deployment and loading in regard to dump truck 10 and starting with FIG. 1 and with the AAACS 96 activated by the vehicle operator at the CIM 104 and there being no load on the truck and no auxiliary axles deployed, the weight sensors (either 102A and 102 B or 102A, 102B and 102C) inform the PLC 98 that the weight on the front axle is 12,000 pounds and the weight on the tandem axles 26A and 26B is 16,000 pounds and thus indicates that the tare weight (unladened weight) of the truck 10 is 28,000 pounds. And the PLC 98 from the axle locations provided and employing the information provided by the weight sensors (WS) determines that the existing center of gravity 114 of the truck 10 is located as shown in FIG. 1 and detects whether there is a need for auxiliary axle use employing the detecting technique provided and the maximum allowable weight on the axles and the maximum allowable gross vehicle weight prescribed by the Federal Bridge Formula (FBF). That limits the maximum allowable weight on the front axle 22 to 20,000 pounds, limits the maximum allowable weight on the tandem axles 26A and 26B to 34,000 pounds, and limits the maximum allowable gross weight of the truck to 54,000 pounds with these supporting axles. And in this case, the control system finds that the minimum gross vehicle weight of 50,000 pounds for auxiliary axle deployment is not exceeded and that there is no need for auxiliary axle usage and as a result maintains all of the auxiliary axles in their stowed condition.

Referring next to FIG. 6, a load of 30,000 pounds is now added to the truck 10 with the truck stationary resulting in the gross vehicle weight now being 58,000 pounds and with the truck's center of gravity 114 then relocated rearwardly and upwardly from the location shown in FIG. 1 in the then existing compliance-manageable range A shown in FIG. 6. And with the weight sensors (WS) at the primary axles then informing the PLC 98 that the weight on the front axle 22 is now 16,920 pounds and thus less than the FBF imposed limit of 20,000 pounds, the weight on the tandem axles 26A and 26B is now 41,080 pounds and thus exceeds the FBF imposed limit of 34,000 pounds, and that that the gross vehicle weight of 58,000 exceeds the FBF imposed limit of 54,000 with these supporting axles. And the PLC 98 detects whether there is then a need for auxiliary axle usage employing the detecting conditions provided. And in this instance, the PLC 98 detects there is such need based on the information received from the weight sensors (WS) and determines that the deployment of the forward-most pusher axle 30A and the trailing axle 34 as being a suitable efficient use with this combination of auxiliary axles when deployed that accomplishes the desired objectives including using the least number of auxiliary axles that are available in accomplishing such. Wherein the PLC 98 has determined that the pusher axle 30A and trailing axle 34 on deployment will then provide for a maximum allowable gross vehicle weight of 70,500 pounds pursuant to the FBF with these supporting axles. And wherein the PLC 98 has also determined that the weight to then be carried by the pusher axle 30A is 4,750 pounds and the weight to then be carried by the trailing axle is 6,250 pounds are substantially within their respective allowable weight carrying range.

Turning next to FIG. 7 and with the PLC 98 having determined a suitable response as described above to the existing loaded condition of the truck 10, the PLC then automatically executes the deployment of the pusher axle 30A and trailing axle 34 as shown in exercising control over their respective control circuits 54A and 78 when the truck eventually travels at a speed of 5 mph or more for 5 seconds that has been implemented by the PLC. And by the PLC 98 with control of the pressure regulator valves 58A and 86 initially establishing the weight carried by the deployed auxiliary axles 30A and 34 at their minimum allowable carrying weight of 1,500 pounds and 2,500 pounds respectively and then increasing these loads to the PLC-determined loads of 4,750 pounds and 6,250 pounds respectively that are less than their respective maximum allowed carrying weight of 8,000 pounds and 13,000 pounds. And with such auxiliary axle loading operations resulting in the front axle 22 then carrying 17,000 pounds and the tandem axles 26A and 26B then carrying 30,000 pounds with the weight apportioning provided by the auxiliary axles 30A and 34 and thus being advantageously loaded in their respective optimum weight carrying range and at less than their respective maximum allowable carrying weight of 20,000 pounds and 34,000 pounds imposed by the FBF. And wherein the maximum allowable gross vehicle weight imposed by the FBF has then increased from 54,000 pounds to 70,500 pounds with the axles then supporting vehicle that now includes auxiliary axles 30A and 34 and results in the existing vehicle weight of 58,000 pounds not exceeding that imposed by the FBF.

Referring next to FIG. 8 and with the condition of the pusher axle 30A and trailing axle 34 established as described above, an additional load of 10,000 pounds is now added with the truck stationary resulting in the load then being increased from 30,000 pounds to 40,000 pounds, the gross vehicle weight thus being increased from 58,000 pounds to 68,000 pounds, and the existing vehicle center of gravity 114 now relocated upward accordingly in the then existing compliance-manageable center range A of auxiliary axle usage that has narrowed with the increase in the gross vehicle weight (GVW). And the weight sensors (WS) at the primary axles then inform the PLC 98 that the weight carried by the front axle 22 is now 18,560 pounds and still less than its maximum allowable carrying weight but the weight on the tandem axles 26A and 26B is now 38,140 pounds and thus exceeds their maximum allowable carrying weight of 34,000 pounds imposed by the FBF.

The PLC 98 then processes the current weigh information received on the primary axles 22, 26A and 26B and determines that the currently deployed auxiliary axles 30A and 34 will still provide for the carrying weight of the primary axles being within their optimum weight carrying range with a minimum number of auxiliary axles by increasing the weight on the deployed pusher axle 30A from 4,750 pounds to 8,000 pounds that is the maximum allowable for this axle and increasing the weight on the deployed trailing axle 34 from 6,250 pounds to 10,350 pounds that is less than its maximum allowed carrying weight of 13,000 pounds. With such adjusting operations resulting in the front axle 22 then carrying 17,830 pounds that is within its optimum weight carrying range and the tandem axles 26A and 26B then carrying 31,820 pounds that is within their optimum weight carrying range, and with the existing gross vehicle weight of 68,000 pounds being less than the maximum of 70,500 pounds allowed by the FBF with the existing supporting axles. And the AAACS 98 then carries out these auxiliary axle load adjustments with the pressure regulator valves 58A and 86 with the weights carried by the supporting axles then set as described immediately above with the pusher axle 30A and trailing axle 34 remaining deployed as shown in FIG. 9.

Turning now to FIG. 10 and with the auxiliary axle 30A and trailing axle 34 conditioned as described immediately above, an additional load of 7,000 pounds is then added with the truck stationary resulting in the load now being 47,000 pounds and the gross vehicle weight being 75,000 pounds that is greater than the maximum allowed weight of 70,500 pounds imposed by the FBF with the then supporting axles. And wherein the truck's center of gravity has relocated upwardly accordingly within the existing compliance-manageable range A of auxiliary axle usage. And the weight sensors (WS) at the primary axles inform the PLC 98 that the weight carried by the front axle 22 is now 18,520 pounds and thus outside its optimum weight carrying range but still allowable but the weight carried by the tandem axles 26A and 26B is now 38,130 pounds and exceeds the limit of 34,000 pounds imposed by the FBF.

The PLC 98 detects these noncompliant axle weight carrying conditions and then processes the weight information received on the primary axles and determines that a suitable combination of supporting axles is obtained by deploying pusher axle 30C, maintaining the weight on the deployed pusher axle 30A at the maximum allowable 8,000 pounds for this axle, establishing the weight carried by the added pusher axle 30C with the regulator valve 58C at the maximum allowable 8,000 pounds for this axle 58C, and increasing the weight carried by the deployed trailing axle 34 from 10,350 pounds to 12,000 pounds that is less than its allowable 13,000 pounds. Which will result in the front axle 22 carrying 17,800 pounds that is within its optimum weight carrying range, the tandem axles 26A and 26B carrying 29,820 pounds that is within their optimum weight carrying range, and the existing gross vehicle weight of 75,000 pounds being less than the maximum allowable weight of 75,500 pounds imposed by the FBF with the axles then supporting the vehicle. With the AAACS 96 providing this auxiliary axle usage involving the auxiliary axles 30A, 30C and 34 when the truck following this increase in the load eventually travels at a speed of 5 mph or more for 5 seconds with the weights carried by all of the supporting axles then set as described immediately above with the pusher axles 30A and 30C and the trailing axle 34 deployed as shown in FIG. 11.

Referring next to FIG. 12 and with the auxiliary axles 30A, 30C and 34 deployed and conditioned as described immediately above, an additional load of 5,000 pounds is added with the truck stationary resulting in the load now being 52,000 pounds and the gross vehicle weight now being 80,000 pounds that exceeds the maximum allowable weight of 75,500 pounds imposed by the FBF with the existing supporting axles. And with the truck's center of gravity 114 having relocated upward accordingly in the compliance-manageable range A. And the weight sensors (WS) at the primary axles inform the PLC 98 that the weight carried by the front axle 22 is now 17,800 pounds and thus within its optimum weight carrying range but the weight carried by the tandem axles 26A and 26 B is now 34,200 pounds and thus exceeds the limit of 34,000 pounds imposed by the FBF.

The PLC 98 processes the information received on the primary axles, detects the noncompliant axle weight carrying conditions and determines that suitable auxiliary usage is obtained in meeting the desired objectives by deploying the pusher axle 30B, reducing the weight on the deployed pusher axle 30A from the maximum allowable 8,000 pounds to 4,230 pounds that is greater than the minimum allowed, maintaining the weight on the deployed pusher axle 30C at 8,000 pounds that is the maximum allowed for this axle, increasing the weight on the deployed trailing axle from 12,000 pounds to 12,770 pounds, and establishing the weight carried by the added pusher axle 30B with the regulator valve 58B at 8,000 pounds that is the maximum allowed for this axle. Which will result in the front axle carrying 17,180 pounds that is within this axle's optimum weight carrying range, the tandem axles 26A and 26B carrying 30,000 pounds that is within their optimum weight carrying range, and the maximum allowable gross vehicle weight imposed by the FBF having increased from 75,500 pounds to 80,000 because of the added supporting axle 30B.

And with the AAACS 96 establishing this auxiliary axle usage with the truck having a current gross vehicle weight of 80,000 pounds when the truck eventually travels at a speed of 5 mph or more for 5 seconds with the weights carried by all of the vehicle supporting axles then set as described immediately above with the pusher axles 30A, 30B, 30C and the trailing axle 34 deployed as shown in FIG. 13.

Turning now to FIG. 14, an additional load of 5,000 pounds is then added with the truck stationary resulting in the gross vehicle weight now being 85,000 pounds that exceeds the limit imposed by the FBF, and the truck's center of gravity 114 now relocated further upward accordingly in the compliance-manageable range A. And the weight sensors (WS) at the primary axles inform the PLC 98 that the weight carried by the front axle 22 is now 17,580 pounds and still in its optimum weight range but the weight carried by the tandem axles 26A and 26B is now 34,420 pounds and thus exceeds the limit of 34,000 pounds imposed by the FBF as well as the current gross vehicle weight of 85,000 exceeding the 80,000 pounds limit imposed by the FBF.

The PLC 98 on detecting such then processes the information received in determining the most suitable auxiliary axle use wherein the programming of the PLC as set forth favors the forward-most primary axle that typically has steerable wheels providing for vehicle steerage over utilizing one of the other possible combinations of the available auxiliary axles with the primary axles. With such preference for the front axle occurring but only when multiple combinations exist that result in the same VDAL, VDOL, or VDUL. In this case, the system recognizes that unacceptable loading is unavoidable due to overloading, but it is able to make all axles and GCAs acceptable except for the group of all axles. Then the front axle is preferred in the formula for VDUL because its weight is lower. And if two combinations resulted in the same VDUL, the system would select the one where the DUL for the front axle is lowest.

And in this case with the truck 10 overloaded in respect to the maximum gross vehicle weight allowed by the FBF, it is determined that optimal auxiliary axle loading is obtained by increasing the weight carried by the deployed pusher axle 30A from 4,230 pound to 6,870 pounds, maintaining the weight on the deployed pusher axles 30B and 30C at their maximum allowable load of 8,000 pounds and increasing the weight on the deployed trailing axle from 12,770 pounds to its maximum allowed carrying weight of 13,000 pounds. Which will result in the front axle 22 then carrying 16,000 pounds and thus within this axle's optimum weight carrying range and the tandem axles 26A and 26B carrying 33,130 pounds that is thus less than their maximum allowable weight of 34,000 pounds imposed by the FBF but greater than their maximum optimum carrying weight. With the AAACS 96 carrying out this action when the truck eventually travels at a speed of 5 mph or more for 5 seconds as shown in FIG. 15. And with the AAACS 96 also informing the vehicle operator via the CIM 104 that the only resulting noncompliance is that the maximum allowable gross vehicle weight of 80,000 set by the FBF has been exceeded.

Turning now to FIG. 16, the truck 10 is shown with all auxiliary axles stowed and a load of 52,000 pounds has been added resulting in the gross vehicle weight being 80,000 pounds that is the maximum allowed by the FBF with all of the available auxiliary axles supporting the vehicle. But in this case the existing center of gravity 114 is located outside and rearward of the compliance-manageable range A with the weight sensors (WS) at the primary axles informing the PLC 98 that the weight on the front axle 22 is 13,940 pounds and that on the tandem axles 26A and 26B is 66,060 pounds. And with the PLC 98 programmed as set forth in detecting this condition then determines that the most suitable auxiliary axle use is established with deployment of all the auxiliary axles. Wherein the pusher axle 30A carries its minimum allowable weight of 1,500 pounds, the pusher axle 30B carries 6,500 pounds that is within its allowable weight carrying range, the pusher axle 30C carries its maximum allowable carrying weight of 8,000, and the trailing axle 34 carries its maximum allowable carrying weight of 13,000 pounds.

The deployment and loading of the auxiliary axles 30A, 30B, 30C and 34 described immediately above is carried out as shown in FIG. 17 when the vehicle exceeds a speed of 5 mph for 5 seconds. Which results in the front axle 22 carrying its minimum allowable carrying weight of 14,000 pounds and the tandem axles 26A and 26B carrying 36,120 pounds that is greater than the 34,000 pounds allowed by the FBF. And the PLC 98 in carrying out this auxiliary axle deployment and loading sends relevant information to the vehicle operator via the CIM 104 that indicates that the weight on the tandem axles 26A and 26B exceeds their maximum allowed carrying weight and that the vehicle's center of gravity 114 is located too far rearward and outside the compliance-manageable range A that would enable compliance with allowable axle loadings as well as with the maximum gross vehicle weight of 80,000 pounds imposed by the FBF.

Turning now to FIG. 18, the truck 10 is shown with all auxiliary axles stowed and a load of 52,000 pounds has been added resulting in the gross vehicle weight being 80,000 pounds that is the maximum allowed by the FBF with all of the available auxiliary axles supporting the vehicle. But in this case the existing center of gravity 114 is located outside and forward of the compliance-manageable range A with the weight sensors (WS) at the primary axles informing the PLC 98 that the weight on the front axle 22 is 25,760 pounds and that on the tandem axles 26A and 26B is 54,240 pounds. And with the PLC 98 programmed as set forth in detecting this condition then determines that the most suitable auxiliary axle use is established with deployment of all the auxiliary axles. Wherein the pusher axle 30A carries its maximum allowable weight of 8,000 pounds, the pusher axle 30B carries its maximum allowable weight of 8,000 pounds, the pusher axle 30C carries 7,840 pounds that is less than the maximum allowed, and the trailing axle 34 carries 10,160 pounds that is less than the maximum allowed.

The deployment and loading of the auxiliary axles 30A, 30B, 30C and 34 described immediately above is carried out as shown in FIG. 19 when the vehicle exceeds a speed of 5 mph for 5 seconds. Which results in the front axle 22 carrying its maximum allowable weight of 20,000 pounds and the tandem axles 26A and 26B carrying their minimum allowable weight of 26,000 pounds. Wherein the GCA that includes the front axle and tandem axles and all the auxiliary axles except the trailing axle carrying 69,840 pounds that exceeds the limit of 68,000 pounds imposed by the FBF and is thus unacceptable. And the PLC 98 in carrying out this auxiliary axle deployment and loading sends relevant information to the vehicle operator via the CIM 104 indicating this auxiliary usage that results in the lowest VDUL as compared to allowing the weight on the front axle and/or tandem axles being unacceptable.

With the PLC 98 programmed as set forth, the AAACS 96 is also adapted to allow for the vehicle operator to specify the stowing or deploying and/or loading of any auxiliary axle and then effect auxiliary axle usage accordingly. For example, the AAACS 96 is adapted to (a) allow an operator of the vehicle to specify the stowing or deploying of any auxiliary axle and (b) effect auxiliary axle usage utilizing the specified stowing or deploying of any auxiliary axle while maintaining control of any auxiliary axle usage that has not been specified by the vehicle operator. Furthermore, the AAACS 96 is also adapted to allow an operator of the vehicle to (a) specify the loading of any auxiliary axle when deployed provided the specified loading is an acceptable specified loading that is not less than this auxiliary axle's prescribed minimum allowable carrying weight and not greater than this auxiliary axle's prescribed maximum allowable carrying weight and (b) effect auxiliary axle usage utilizing the acceptable specified loading of any auxiliary axle while maintaining control of any auxiliary axle usage that has not been specified by the vehicle operator. Furthermore, the AAACS 96 is also adapted to (a) allow an operator of the vehicle to specify the stowing or deploying of any auxiliary axle and the loading of any auxiliary axle when deployed provided the specified loading thereof is an acceptable specified loading that is not less than this auxiliary axle's prescribed minimum allowable carrying weight and not greater than this auxiliary axle's prescribed maximum allowable carrying weight and (b) effect auxiliary axle usage utilizing the specified stowing or deploying of any auxiliary axle and the acceptable specified loading of any auxiliary axle while maintaining control of any auxiliary axle usage that has not been specified by the vehicle operator.

Moreover, the vehicle operator can specify the stowing or deploying and loading of any auxiliary axle at any time. For example, in the daily operations of the vehicle, conditions can arise where the vehicle operator may want to specify the stowing or deploying and/or loading condition of one or more of the auxiliary axles to alleviate an existing problem. Such as when the vehicle operator notices that an auxiliary axle and/or one or both of its tires is damaged and may then want to keep that axle stowed until repairs are made or the axle is replaced in which case the vehicle operator can specify it to be stowed or limit the load that will be placed on the axle when it is used and in that case also specify the loading thereof as being the minimum allowable loading. With the AAACS 96 accounting for the auxiliary axle usage specified by the vehicle operator and providing for the optimal use of any remaining auxiliary axles accordingly. And if the optimal usage of the remaining auxiliary axles results in any noncompliance due to the vehicle operator specified usage, the vehicle operator is notified of such by the AAACS 96.

Furthermore, the vehicle operator can specify auxiliary axle usage changes while in the process of operating the vehicle as there is no need to specify any stowing or deploying and/or loading beforehand. For example, the AAACS 96 may deploy all of the auxiliary axles and load them as tasked and this will be a combination of stowing or deploying and/or loading that results in the most optimal redistribution of weight between the supporting axles, but not necessarily the only combination. For example, one pusher axle may be loaded with 5,000 pounds and another pusher axle loaded with 8,000 pounds that is the maximum allowable. The vehicle operator could then, with these axles deployed and loaded already, increase the loading on the one pusher axle from 5,000 pounds to 6,000 pounds and the AAACS 96 will automatically adjust the loading on the other pusher axle from 8,000 pounds to 7,000 pounds that is below the maximum allowed. And this may result in weight redistribution that is just as "optimal" as before. Or if the change effected by the vehicle operator causes less optimal loading, the AAACS 96 will so notify the vehicle operator who can then choose to leave the manually specified loading on the one pusher axle and proceed with the operation of the vehicle. And if the vehicle operator makes such an override and finds the resulting redistribution unacceptable, the vehicle operator can then revert back to automatic loading of all of the auxiliary axles by the AAACS 96.

With the PLC 98 programmed as set forth, the AAACS 96 is also adapted in the above examples of trailing axle deployment to detect and view an object in the path of such deployment employing the Clearance Monitoring Module 112. And on such detection, prevent an enabled deployment of the trailing axle 34 from occurring or cease deployment if underway and return the trailing axle to its stowed condition and thereafter delay the enabled deployment from occurring until the path is clear. And on such detection, also alert the vehicle operator of this situation via the Command and Informational Module 104 and that viewing of the scene is being provided.

To further aid in understanding the versatility of the AAACS 96, the application thereof to other auxiliary axle arrangements is shown in FIGS. 20-32. Wherein it will be understood that each auxiliary axle has a control circuit comparable to those described above and that a tag axle has a suspension system and control circuit like that of a pusher axle as described above. And in each case, only the near-side wheels appear and an auxiliary axle is shown in its stowed inactive condition with solid lines and is shown in its deployed active condition with phantom lines.

Referring now to FIG. 20, there is shown a dump truck 116 like that in U.S. Pat. No. 8,523,203 and incorporating the AAACS 96. Wherein the primary axles comprise a front axle 118 with steerable wheels 120 and powered tandem axles 122A and 122B with dual wheels 124A and 124B respectively. And the auxiliary axles comprise three pusher axles 126A, 126B and 126C with wheels 128A, 128B and 128C respectively, and a trailing axle 130 with wheels 132. Noting that the hydraulically-operated actuators 134 in the trailing axle suspension system 136 (only the nearside one being shown) are pivotally connected to the dump body 138 at a strategically high elevation to provide for enhanced roll stability of the truck derived from the trailing axle.

In adapting the AAACS 96 to the dump truck 116, the suspension control circuits of the pusher axles 126A, 126B and 126C and that of the trailing axle 130 are placed under the management of the AAACS in the manner previously described in controlling the stowing, deploying and the force applied to the auxiliary axles 126A, 126B, 126C and 130 employing the relevant information provided to the PLC 98 for application to the truck 116. Whereby the AAACS 96 is conditioned to control the stowing, deployment and loading of these auxiliary axles in a manner like that previously described in suitably apportioning the weight of the dump truck 116 between all of the axles then supporting on the truck. And for example, such apportioning in establishing compliance with the allowable axle loadings is provided when the truck's center of gravity 140 that exists with the maximum allowable gross vehicle weight is located as shown in the applicable compliance-manageable range A and also to the extent possible when the truck's center of gravity that exists with the maximum allowable gross vehicle weight is in either of the locations 140X and 140XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 21, there is shown a dump truck 142 AAACS 96 wherein the dump truck is like that in the previously-identified U.S. patent application Ser. No. 14/803,038 entitled "DUAL TRAILING AXLE SUSPENSION SYSTEM" that is hereby incorporated by reference. With the primary axles comprising a front axle 146 with steerable wheels 148 and powered tandem axles 150A and 150B with dual wheels 152A and 152B respectively. And with the auxiliary axles comprising three pusher axles 154A, 154B and 154C with wheels 156A, 156B and 156C respectively and a pair of trailing axles 158A and 158B with wheels 160A and 160B respectively that are suspended from the dump body 164 of the truck by a dual trailing axle suspension system 166. Wherein the dual trailing axle suspension system 166 includes a pair of laterally-spaced hydraulically-operated actuators 168 (only the nearside one being shown) that are operable to stow the trailing axles 158A and 158B on the dump truck as shown in solid lines and deploy the trailing axles as shown in phantom lines and while deployed establish a resisting force that enables air springs (not shown) in forcing the trailing axles to help support the dump truck 142 in a controllable manner.

In adapting the AAACS 96 to the dump truck 142, the control circuits of the pusher axles 154A, 154B and 154C and that of the trailing axle actuators 168 are placed under the management of the AAACS 96 in controlling the stowing, deploying and the force applied to the auxiliary axles 154A, 154B, 154C, 158A and 158B while deployed employing the relevant information provided to the PLC 98 for application to the dump truck 142. Whereby the AAACS 96 is conditioned to control the stowing, deployment and loading of these auxiliary axles in a manner like that previously described in suitably apportioning the weight of the dump truck 142 between all of the axles then supporting the vehicle. And for example, such apportioning in establishing full compliance with the allowable axle loadings is provided when the center of gravity 170 of the vehicle that exists with the maximum allowable gross vehicle weight with the supporting axles available is located as shown in the applicable compliance-manageable range A and also to the extent possible in minimizing noncompliance with the allowable axle loadings when the vehicle's center of gravity that exists with the maximum allowable gross vehicle weight is in either of the locations 170X and 170XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable-range that has narrowed as a result and also when the truck's existing weight is less than or more than the maximum allowable gross vehicle weight with the existing center of gravity of the truck located outside the then applicable compliance-manageable range.

Furthermore, in the previously-identified U.S. patent application Ser. No. 14/803,041 entitled "TRAILER HITCH" that is hereby incorporated by reference, there is disclosed trailer axles that also serve as trailing axles. And in adapting the AAACS 96 thereto, results like that described above with respect to the trailing axles in FIG. 21 are similarly obtained with the trailer axles in serving as trailing axles.

Referring now to FIG. 22, there is shown a dump truck 172 incorporating the AAACS 96. Wherein the primary axles comprise a front axle 174 with steerable wheels 176 and powered tandem axles 178A and 178B with dual wheels 180A and 180B respectively at their outboard ends. And only a singular auxiliary axle is provided by a pusher axle 182 with wheels 184.

In adapting the AAACS 96 to the dump truck 172, the suspension control circuit of the pusher axle 182 is placed under the management of the AAACS in the manner previously described in controlling the stowing, deploying and the force applied to the auxiliary axle 182 employing the relevant information provided to the PLC 98 for application to the dump truck 172. Whereby the AAACS 96 is conditioned to control the stowing, deployment and loading of the auxiliary axle in a manner like that previously described in suitably apportioning the weight of the dump truck 172 between all of the axles then supporting the truck. And for example, such apportioning in establishing compliance with the allowable axle loadings to the extent possible is provided when the truck's center of gravity 186 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 186X and 186XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable-range that has narrowed as a result and also when the truck's existing weight is less than or more than the maximum allowable gross vehicle weight with the existing center of gravity of the truck located outside the then applicable compliance-manageable range.

Referring now to FIG. 23, there is shown a refuse truck 188 incorporating the AAACS 96. Wherein the primary axles comprise a front axle 190 with steerable wheels 192 and powered tandem axles 194A and 194B with dual wheels 196A and 196B respectively. And the auxiliary axles comprise a pusher axle 198 with wheels 200 and a tag axle 202 with wheels 204.

In adapting the AAACS 96 to the refuse truck 172, the suspension control circuits of the pusher axle 198 and tag axle 202 are placed under the management of the AAACS in the manner previously described in controlling the stowing, deploying and the force applied to the auxiliary axles 198 and 202 employing the relevant information provided to the PLC 98 for application to the refuse truck 188. Whereby the AAACS 96 is conditioned to control the stowing, deployment and loading of these auxiliary axles in a manner like that previously described in suitably apportioning the weight of the refuse truck 188 between all of the axles then supporting the truck. And for example, such apportioning in establishing compliance with the allowable axle loadings to the extent possible is provided when the truck's center of gravity 206 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 206X and 206XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 24, there is shown a refuse truck 208 incorporating the AAACS 96. Wherein the refuse truck is like that in U.S. Pat. No. 8,523,202 that is hereby incorporated by reference and has primary axles consisting of a front axle 210 with steerable wheels 212, powered tandem axles 214A and 214B with wheels 216 and 216B respectively, and auxiliary axles consisting of a pusher axle 218 with wheels 220 and a trailing axle 222 with wheels 224.

In adapting the AAACS 96 to the refuse truck 208, the suspension control circuits of the pusher axle 218 and trailing axle 222 are placed under the management of the AAACS in the manner previously described in controlling the stowing, deploying and the force applied to these auxiliary axles 218 and 222 employing the relevant information provided to the PLC 98 for application to the refuse truck 208. Whereby the AAACS 96 is conditioned to control the stowing, deployment and loading of these auxiliary axles in a manner like that previously described in suitably apportioning the weight of the refuse truck 208 between all of the axles then supporting the truck. And for example, such apportioning in establishing compliance with the allowable axle loadings to the extent possible is provided when the truck's center of gravity 226 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 226X and 226XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 25, there is shown a refuse truck 228 incorporating the AAACS 96. Wherein the refuse truck has primary axles consisting of forwardly-located axles 230A and 230B with interlinked steerable wheels 232A and 232B respectively and rearwardly-located powered tandem axles 234A and 234B with dual wheels 236A and 236B respectively at their outboard ends. And for auxiliary axles, the truck has only a trailing axle 238 with wheels 240 wherein the trailing axle suspension system is like that in U.S. Pat. No. 8,523,202 that has been incorporated by reference.

In adapting the AAACS 96 to the refuse truck 228, the suspension control circuit of the trailing axle 238 is placed under the management of the AAACS in the manner previously described in controlling the stowing, deploying and the force applied to the auxiliary axle 238 employing the relevant information provided to the PLC 98 for application to the refuse truck 228. Whereby the AAACS 96 is conditioned to control the stowing, deployment and loading of the auxiliary axle 238 in a manner like that previously described in suitably apportioning the weight of the refuse truck 228 between all of the axles then supporting the truck. And for example, such apportioning in establishing compliance with the allowable axle loadings to the extent possible is provided when the truck's center of gravity 244 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 244X and 244XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 26, there is shown a transit mixer truck 248 incorporating the AAACS 96. Wherein the truck has primary axles consisting of a front axle 250 with steerable wheels 252 and powered tandem axles 254A and 254B with dual wheels 256A and 256B respectively at their outboard ends, and auxiliary axles consisting of a pusher axle 258 with wheels 260 and a trailing axle 262 with wheels 264. And wherein the suspension control circuit of the pusher axle 258 and that of the trailing axle 262 are placed under the management of the AAACS 96 in controlling the stowing, deploying and loading of the auxiliary axles 258 and 262 employing the relevant information provided for the transit mixer truck 248.

In adapting the AAACS 96 to the transit mixer truck 248, the suspension control circuits of the pusher axle 258 and trailing axle 262 are placed under the management of the AAACS in the manner previously described in controlling the stowing, deploying and the force applied to the auxiliary axles 258 and 262 employing the relevant information provided to the PLC for application to the transit mixer truck 248. Whereby the AAACS 96 is conditioned to control the stowing, deployment and loading of these auxiliary axles in a manner like that previously described in suitably apportioning the weight of the transit mixer truck 248 between all of the axles then supporting the truck. And for example, such apportioning in establishing compliance with the allowable axle loadings to the extent possible is provided when the transit mixer truck's center of gravity 266 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 266X and 266XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 27, there is shown a military load-transporting truck 268 incorporating the AAACS 96. Wherein the primary axles comprise a front axle 270 with steerable wheels 272 and powered tandem axles 274A and 274B with dual wheels 276A, and 276B respectively at their outboard ends. And wherein the truck has a singular auxiliary axle in the form of a pusher axle 278 with wheels 280.

In adapting the AAACS 96 to the military load-transporting truck 268, the suspension control circuit of the pusher axle 278 is placed under the management of the AAACS in the manner previously described in controlling the stowing, deploying and the force applied to the auxiliary axle 278 employing the relevant information provided to the PLC for application to the military truck 268. Whereby the AAACS 96 is conditioned to control the stowing, deployment and loading of the auxiliary axle 278 in a manner like that previously described in suitably apportioning the weight of the military truck 268 between all of the axles then supporting the truck. And for example, such apportioning in establishing compliance with the allowable axle loadings to the extent possible is provided when the truck's center of gravity 282 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 282X and 282XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 28, there is shown another military load-transporting truck 284 incorporating the AAACS 96. Wherein the primary axles comprise a front axle 286 with steerable wheels 288 and powered tandem axles 290A and 290B with wheels 292A, and 292B respectively at their outboard ends. And wherein only a singular auxiliary axle is provided by a tag axle 294 with wheels 296.

In adapting the AAACS 96 to the military load-transporting truck 284, the suspension control circuit of the auxiliary axle 294 is placed under the management of the AAACS in the manner previously described in controlling the stowing, deploying and the force applied to the tag 294 employing the relevant information provided for application to the military truck 284. Whereby the AAACS 96 is conditioned to control the stowing, deployment and loading of the auxiliary axle 294 in a manner like that previously described in suitably apportioning the weight of the military truck 284 between all of the axles then supporting the truck. And for example, such apportioning in establishing compliance with the allowable axle loadings to the extent possible is provided when the truck's center of gravity 298 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 298X and 298XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 29, there is shown an open-bed truck 300 incorporating the AAACS 96. Wherein the primary axles comprise a front axle 302 with steerable wheels 304 and powered tandem axles 306A and 306B with dual wheels 308A, and 308B respectively at their outboard ends. And the auxiliary axles comprise a pusher axle 310 with wheels 312 and a tag axle 314 with wheels 316.

In adapting the AAACS 96 to the open-bed truck 300, the suspension control circuits of the pusher axle 310 and tag axle 314 are placed under the management of the AAACS in the manner previously described in controlling the stowing, deploying and the force applied to the auxiliary axles 310 and 314 employing the relevant information provided to the PLC 98 for application to the open-bed truck 300. Whereby the AAACS 96 is conditioned to control the stowing, deployment and loading of these auxiliary axles in a manner like that previously described in suitably apportioning the weight of the open-bed truck 300 between all of the axles then supporting the truck. And for example, such apportioning in establishing compliance with the allowable axle loadings to the extent possible is provided when the truck's center of gravity 318 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 318X and 318XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 30, there is shown an extended-body transporting truck 320 incorporating the AAACS 96. Wherein the primary axles comprise a front axle 322 with steerable wheels 324 and powered tandem axles 326A and 326B with dual wheels 328A, and 328B respectively at their outboard ends. And wherein the auxiliary axles comprise pusher axles 330A, 330B and 330C with wheels 332A, 332B and 332C respectively, and tag axles 334A and 334B with wheels 336A and 336B respectively.

In adapting the AAACS 96 to the extended open-bed truck 320, the suspension control circuits of the pusher axles 330A, 330B and 330C and tag axles 334A and 334B are placed under the management of the AAACS in the manner previously described in controlling the stowing, deploying and the force applied to the auxiliary axles 330A, 330B, 330C, 334A and 334B employing the relevant information provided to the PLC 98 for application to the extended-body truck 320. Whereby the AAACS 96 is conditioned to control the stowing, deployment and loading of these auxiliary axles in a manner like that previously described in suitably apportioning the weight of the open-body truck 320 between all of the axles then supporting the truck. And for example, such apportioning in establishing compliance with the allowable axle loadings to the extent possible is provided when the truck's center of gravity 338 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 338X and 338XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Referring now to FIG. 31, there is shown a liquid-transporting truck 340 incorporating the AAACS 96. Wherein the primary axles comprise a front axle 342 with steerable wheels 344 and powered tandem axles 346A and 346B with dual wheels 348A, and 348B respectively at their outboard ends. And wherein the auxiliary axles comprise a pusher axle 350 with wheels 352 and a tag axle 354 with wheels 356.

In adapting the AAACS 96 to the liquid-transporting truck 340, the suspension control circuits of the pusher axle 350 and tag axle 354 are placed under the management of the AAACS in the manner previously described in controlling the stowing, deploying and the force applied to the auxiliary axles 350 and 354 employing the relevant information provided to the PLC 98 for application to the liquid-transporting truck 340. Whereby the AAACS 96 is conditioned to control the stowing, deployment and loading of these auxiliary axles in a manner like that previously described in suitably apportioning the weight of the truck 340 between all of the axles then supporting the truck. And for example, such apportioning in establishing compliance with the allowable axle loadings to the extent possible is provided when the truck's center of gravity 358 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 358X and 358XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

Figure 32:
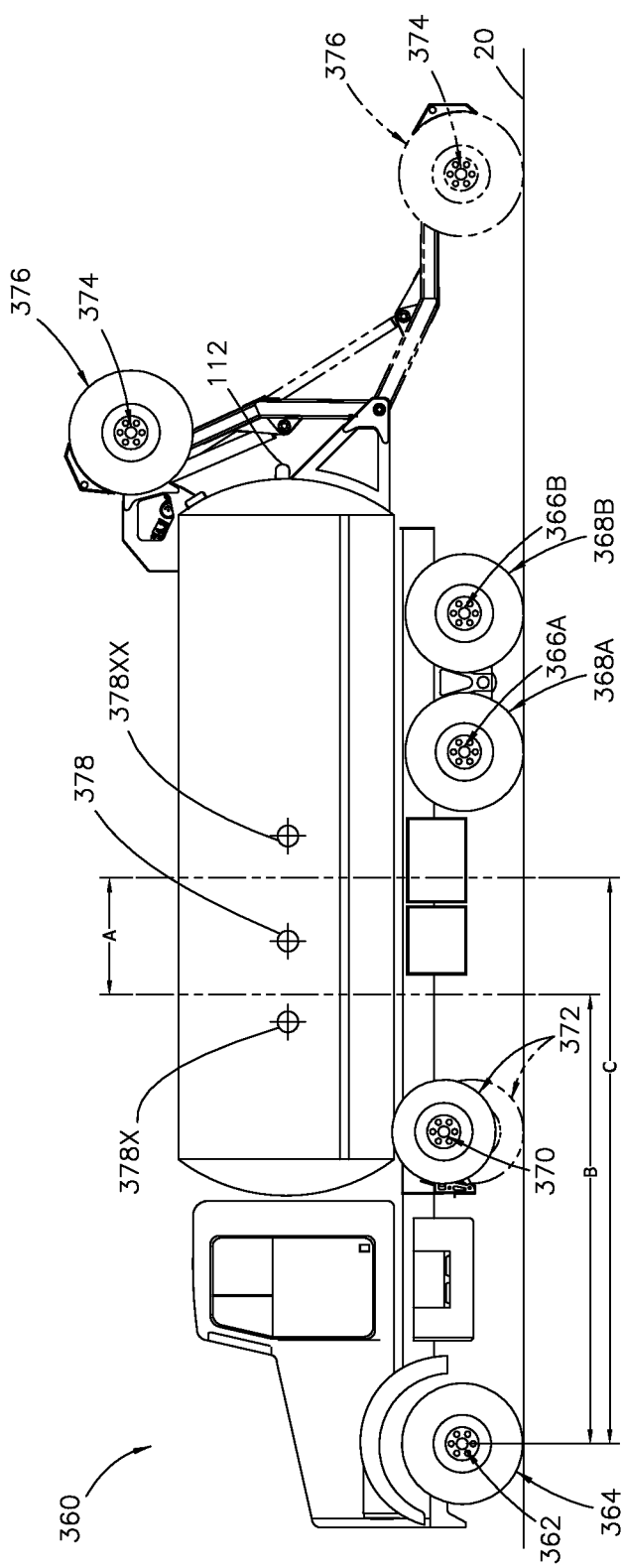
FIG. 32 is a side view of another liquid-transporting truck incorporating the automatic auxiliary axle control system according to the present invention wherein the truck has a pusher axle and a trailing axle.

Referring now to FIG. 32, there is shown another liquid-transporting truck 360 incorporating the AAACS 96. Wherein the primary axles comprise a front axle 362 with steerable wheels 364 and powered tandem axles 366A and 366B with dual wheels 368A and 368B respectively at their outboard ends. And wherein the auxiliary axles comprise a pusher axle 370 with wheels 372 and a trailing axle 374 with wheels 376.

In adapting the AAACS 96 to the liquid-transporting truck 360, the suspension control circuits of the pusher axle 370 and trailing axle 374 are placed under the management of the AAACS in the manner previously described in controlling the stowing, deploying and the force applied to the auxiliary axles 370 and 374 employing the relevant information provided to the PLC 98 for application to the liquid-transporting truck 360. Whereby the AAACS 96 is conditioned to control the stowing, deployment and loading of these auxiliary axles in a manner like that previously described in suitably apportioning the weight of the truck 360 between all of the axles then supporting the truck. And for example, such apportioning in establishing compliance with the allowable axle loadings to the extent possible is provided when the truck's center of gravity 378 that exists with the maximum allowable gross vehicle weight is located as shown in the applicable compliance-manageable range A and also to the extent possible in minimizing noncompliance with the allowable axle loadings when the truck's center of gravity that exists with the maximum allowable gross vehicle weight is in either of the locations 378X and 378XX located outside this range. And with load apportioning also provided by the AAACS that minimizes any noncompliance with the allowable axle loadings to a prescribed degree when the truck's existing weight exceeds the maximum allowable gross vehicle weight with the existing center of gravity of the truck located within the applicable compliance-manageable range that has narrowed as a result and also when the truck's existing weight is less than or more than the maximum allowable gross vehicle weight with the existing center of gravity of the truck located outside the then applicable compliance-manageable range.

It will also be appreciated that having disclosed the AAACS according to the present invention as applied to a wide variety of load-transporting vehicles, it will be appreciated that such can be applied to others employing other auxiliary axle usage involving a pusher axle, tag axle and/or trailing axle and in any suitable number with regard to each. And it will also be appreciated that a vehicle may be without existing means of detecting the weight carried by one or more of the axles and/or the pressure applied to load an auxiliary axle and such can be provided like in the manner disclosed with respect to a pusher axle, tag axle and trailing axle. And in the case of the current weight being carried by one or more of the then supporting axles, such information can be provided to the PLC with the use of platform scales at a weighing station and portable scales placed under the wheels as earlier indicated. Moreover, it will be understood that a clearance-monitoring module like that disclosed with respect to a trailing axle and with or without a coupled surveillance camera could be utilized in a like manner at each available auxiliary axle in the exemplary embodiments and other applications of the AAACS to other forms of load-transporting motor vehicles.

It will also be appreciated that the primary and auxiliary axle suspension systems can also take other forms in utilizing the AAACS according to the present invention to control the deployment and the weight carried by one or more auxiliary axles and thereby the weight carried by the primary axles and thereby the weight carried by all of the axles then supporting the vehicle. For example, the primary axle suspension systems can be of the gas spring type or coil spring type to provide for cushioning. While the pusher axle and tag axle suspension systems can be of the hydraulically actuated type incorporating gas springs or leaf or coil springs for cushioning and employing the hydraulic actuators for pusher axle and tag axle stowing and deployment and loading. And the trailing axle suspension system can be of the type wherein hydraulic actuators without gas spring action are utilized and cushioning is provided by leaf springs or coil springs or gas springs that are separate from the actuators providing for trailing axle stowing and deployment and loading. And with regard to gas springs, they can utilize a gas more suitable than air for the intended vehicle use.

And thus the scope of the invention is intended to be limited only by the accompanying claims.

The invention claimed is:

1. An automatic auxiliary axle control system for a load-transporting motor vehicle wherein
the vehicle has two or more primary axles and one or more auxiliary axles,
the control system is adapted to detect a noncompliant axle carrying weight condition when the weight of the vehicle acting on any primary axle exceeds a prescribed maximum allowable carrying weight assigned to that axle and also when the weight acting on any group of the axles arranged consecutively exceeds a prescribed maximum allowable carrying weight assigned to that axle group, and
the control system on detecting the noncompliant axle carrying weight condition is adapted to effect auxiliary axle usage that results in no maximum allowable axle carrying weight and no maximum allowable axle group carrying weight being exceeded provided (1) the current gross vehicle weight does not exceed a prescribed maximum allowable gross vehicle weight determined by all of the axles, and (2) the current center of gravity of the vehicle is located within a compliance-manageable range determined by (a) the current gross vehicle weight, (b) the maximum allowable carrying weight of each primary axle that has a prescribed maximum allowable carrying weight, (c) the minimum allowable carrying weight of each primary axle that has a prescribed minimum allowable carrying weight, (d) the maximum allowable axle group carrying weight of each axle group that has a prescribed maximum allowable carrying weight, (e) the minimum allowable axle group carrying weight of each axle group that has a prescribed minimum allowable axle group carrying weight, (f) the maximum allowable carrying weight of each auxiliary axle that has a prescribed maximum allowable carrying weight, (g) the minimum allowable carrying weight of each auxiliary axle that has a prescribed minimum allowable carrying weight, and (h) the distance of each primary axle and each auxiliary axle from a fixed datum point on the vehicle.

2. An automatic auxiliary axle control system for a load-transporting motor vehicle as set forth in claim 1 wherein
the control system is adapted to employ the current weight on the primary axles and a prescribed operating pressure-forced axle loading relationship assigned to each available auxiliary axle in determining and effecting the auxiliary axle usage.

3. An automatic auxiliary axle control system for a load-transporting motor vehicle as set forth in claim 1 wherein
the maximum allowable axle carrying weight, the maximum allowable axle group carrying weight and the maximum allowable gross vehicle weight do not exceed those prescribed by state law.

4. An automatic auxiliary axle control system for a load-transporting motor vehicle as set forth in claim 1 wherein
the maximum allowable axle carrying weight, the maximum allowable axle group carrying weight and the maximum allowable gross vehicle weight do not exceed those prescribed by federal law.

5. An automatic auxiliary axle control system for a load-transporting motor vehicle as set forth in claim 1 wherein
the maximum allowable axle carrying weight, the axle group carrying weight and the maximum allowable gross vehicle weight do not exceed those prescribed by state and federal law.

6. An automatic auxiliary axle control system for a load-transporting motor vehicle as set forth in claim 1 wherein
the control system is adapted to effect the auxiliary axle usage employing an auxiliary axle yet to be deployed.

7. An automatic auxiliary axle control system for a load-transporting motor vehicle as set forth in claim 1 wherein
the control system is adapted to effect the auxiliary axle usage employing an auxiliary axle currently deployed.

8. An automatic auxiliary axle control system for a load-transporting motor vehicle as set forth in claim 1 wherein
the group of consecutive axles consists of primary axles.

9. An automatic auxiliary axle control system for a load-transporting motor vehicle as set forth in claim 1 wherein
the group of consecutive axles consists of auxiliary axles.

10. An automatic auxiliary axle control system for a load-transporting motor vehicle as set forth in claim 1 wherein
the group of consecutive axles comprises at least one primary axle and at least one auxiliary axle.

11. An automatic auxiliary axle control system for a load-transporting motor vehicle as set forth in claim 1 wherein
one of the primary axles has a prescribed minimum allowable carrying weight, and
the control system is adapted to effect the auxiliary axle usage such that the resulting weight on the one primary axle is not less than its prescribed minimum allowable axle carrying weight.

12. An automatic auxiliary axle control system for a load-transporting motor vehicle as set forth in claim 1 wherein
each of the primary axles has a prescribed minimum allowable axle carrying weight, and
the control system is adapted to effect the auxiliary axle usage such that the resulting weight on each primary axle is not less than its minimum allowable carrying weight.

13. An automatic auxiliary axle control system for a load-transporting motor vehicle as set forth in claim 1 wherein
one of the primary axles has a prescribed optimum weight carrying range assigned thereto, and the control system is adapted to effect the auxiliary axle usage such that the resulting weight on the one primary axle is within its prescribed optimum weight carrying range.

14. An automatic auxiliary axle control system for a load-transporting motor vehicle as set forth in claim 1 wherein
each of the primary axles has a prescribed optimum weight carrying range assigned thereto, and
the control system is adapted to effect the auxiliary axle usage such that the resulting weight on each primary axle is within its prescribed optimum weight carrying range.

15. An automatic auxiliary axle control system for a load-transporting motor vehicle as set forth in claim 1 wherein
each axle group has a prescribed minimum allowable carrying weight, and
the control system is adapted to effect the auxiliary axle usage such that the resulting weight on each axle group is not less than its prescribed minimum allowable carrying weight.

16. An automatic auxiliary axle control system for a load-transporting motor vehicle as set forth in claim 1 wherein
one axle group has a prescribed optimum weight carrying range assigned thereto, and
the control system is adapted to effect the auxiliary axle usage such that the resulting weight on the one axle group is within its prescribed optimum weight carrying range.

17. An automatic auxiliary axle control system for a load-transporting motor vehicle as set forth in claim 1 wherein
the control system is adapted to detect a noncompliant axle carrying weight condition when the current gross vehicle weight is greater than the maximum allowed gross vehicle weight and the current center of gravity of the vehicle is located within the compliance-manageable range, and
the control system on detecting the noncompliant axle carrying weight condition is adapted to effect auxiliary axle usage such that any resulting noncompliant weight on the primary axles and/or group of axles arranged consecutively and then supporting the vehicle is minimized to a prescribed degree.

18. An automatic auxiliary axle control system for a load-transporting motor vehicle as set forth in claim 1 wherein
the control system is adapted to detect a noncompliant axle carrying weight condition when the current gross vehicle weight is greater than the maximum allowed gross vehicle weight and the current center of gravity of the vehicle is located within the compliance-manageable range,
the control system on detecting the noncompliant auxiliary axle usage condition is adapted to effect auxiliary axle usage such that any resulting noncompliant weight on the primary axles and/or group of axles arranged consecutively and then supporting the vehicle is minimized a prescribed degree, and
the control system is adapted to indicate the existing gross vehicle weight and the weight on the axles then supporting the vehicle following the latter auxiliary axle usage effected.

19. An automatic auxiliary axle control system for a load-transporting motor vehicle as set forth in claim 1 wherein
the control system is adapted to detect a noncompliant auxiliary axle usage condition when the current gross vehicle weight is less than the maximum allowable gross vehicle weight and the current center of gravity of the vehicle is located outside the compliance-manageable range, and
the control system on detecting the latter noncompliant auxiliary axle usage condition is adapted to effect auxiliary axle usage such that any resulting noncompliant weight on the primary axles and/or group of axles arranged consecutively and then supporting the vehicle is minimized to a prescribed degree.

20. An automatic auxiliary axle control system for a load-transporting motor vehicle as set forth in claim 1 wherein
the control system is adapted to detect a noncompliant auxiliary axle usage condition when the current gross vehicle weight is less than the maximum allowable gross vehicle weight and the current center of gravity of the vehicle is located outside of the compliance-manageable range,
the control system on detecting the latter noncompliant auxiliary axle usage condition is adapted to effect auxiliary axle usage such that any resulting noncompliant weight on the primary axles and/or group of axles arranged consecutively and then supporting the vehicle is minimized to a prescribed degree, and
the control system is adapted to indicate the existing gross vehicle weight and the weight on the axles then supporting the vehicle following the latter auxiliary axle usage effected.

21. An automatic auxiliary axle control system for a load-transporting motor vehicle as set forth in claim 1 wherein
the control system is adapted to detect a noncompliant auxiliary axle usage condition when the current gross vehicle weight is greater than the maximum allowable gross vehicle weight and the current center of gravity of the vehicle is located outside the compliance-manageable range, and
the control system on detecting the latter noncompliant auxiliary axle usage condition is adapted to effect auxiliary axle usage such that any resulting noncompliant weight on the primary axles and/or group of axles arranged consecutively and then supporting the vehicle is minimized to a prescribed degree.

22. An automatic auxiliary axle control system for a load-transporting motor vehicle as set forth in claim 1 wherein
the control system is adapted to detect a noncompliant auxiliary axle usage condition when the current gross vehicle weight is greater than the maximum allowable gross vehicle weight and the current center of gravity of the vehicle is located outside the compliance-manageable range,
the control system on detecting the latter noncompliant auxiliary axle usage condition is adapted to effect auxiliary axle usage such that any resulting noncompliant weight on the primary axles and/or group of axles arranged consecutively and then supporting the vehicle is minimized to a prescribed degree, and the control system is adapted to indicate the existing gross vehicle weight and the weight on the axles then supporting the vehicle following the latter auxiliary axle usage effected.

23. An automatic auxiliary axle control system for a load-transporting motor vehicle as set forth in claim 1 wherein
the control system is adapted to effect auxiliary axle deployment after the vehicle has moved forward.

24. An automatic auxiliary axle control system for a load-transporting motor vehicle as set forth in claim 1 wherein
the control system is adapted to effect auxiliary axle deployment when the vehicle has been moving forward at a speed exceeding a prescribed speed for a prescribed length of time.

25. An automatic auxiliary axle control system for a load-transporting motor vehicle as set forth in claim 1 wherein
the control system is adapted to detect an object in the path of deployment of a particular auxiliary axle, and
the control system on detecting such an object is adapted to prevent deployment of this auxiliary axle or cease deployment of this auxiliary axle if underway.

26. An automatic auxiliary axle control system for a load-transporting motor vehicle as set forth in claim 1 wherein
the control system is adapted to detect an object in the path of deployment of a particular auxiliary axle, and
the control system on detecting such an object is adapted to provide for vehicle operator viewing of the object detected and prevent deployment of this auxiliary axle or cease deployment of this auxiliary axle if underway and return it to a stowed condition.

27. An automatic auxiliary axle control system for a load-transporting motor vehicle as set forth in claim 1 wherein
the control system is adapted to detect an object in the path of deployment of each auxiliary axle, and
the control system on detecting such an object is adapted to prevent the deployment of the affected auxiliary axle or cease deployment of this auxiliary axle if underway.

28. An automatic auxiliary axle control system for a load-transporting motor vehicle as set forth in claim 1 wherein
the control system is adapted to detect an object in the path of deployment of each auxiliary axle, and
the control system on detecting such an object is adapted to prevent the deployment of the affected auxiliary axle or cease deployment of this auxiliary axle if underway and return it to a stowed condition.

29. An automatic auxiliary axle control system for a load-transporting motor vehicle as set forth in claim 1 wherein
the control system is adapted to detect an object in the path of deployment of a particular auxiliary axle, and
the control system on detecting such an object is adapted to provide for vehicle operator viewing of the object and prevent the deployment of the affected auxiliary axle or cease deployment of this auxiliary axle if underway.

30. An automatic auxiliary axle control system for a load-transporting motor vehicle as set forth in claim 1 wherein
the control system is adapted to detect an object in the path of deployment of each auxiliary axle, and
the control system on detecting such an object is adapted to provide for vehicle operator viewing of the object and prevent the deployment of the affected auxiliary axle or cease deployment of this auxiliary axle if underway and return it to a stowed condition.

31. An automatic auxiliary axle control system for a load-transporting motor vehicle as set forth in claim 1 wherein
each auxiliary axle has an electronically controlled fluid circuit enabling its operation, and
the control system is electronically linked by wire with the electronically controlled fluid circuit of each auxiliary axle in effecting the auxiliary axle usage.

32. An automatic auxiliary axle control system for a load-transporting motor vehicle as set forth in claim 1 wherein
each auxiliary axle has an electronically controlled fluid circuit enabling its operation, and
the control system is wirelessly linked with the electronically controlled fluid circuit of each auxiliary axle in effecting the auxiliary axle usage.

33. An automatic auxiliary axle control system for a load-transporting motor vehicle as set forth in claim 1 wherein
the control system is adapted to detect a noncompliant weight condition and effect the auxiliary usage employing the current weight carried by the primary axles provided by weight sensors on the vehicle.

34. An automatic auxiliary axle control system for a load-transporting motor vehicle as set forth in claim 1 wherein
the control system is adapted to detect a noncompliant weight condition and effect the auxiliary axle usage employing the current weight carried by the primary axles provided by weight scales separate from the vehicle.

35. An automatic auxiliary axle control system for a load-transporting motor vehicle as set forth in claim 1 wherein
the control system is adapted to immediately accept and utilize weight information provided by a vehicle operator in effecting the auxiliary axle usage.

36. An automatic auxiliary axle control system for a load-transporting motor vehicle as set forth in claim 1 wherein
the control system is adapted to accept and utilize weight information provided by a sensor on the vehicle sensing the weight on a primary axle only when the vehicle is stationary and has remained so for a prescribed length of time and sensor readings do not fluctuate over a prescribed percentage for a prescribed length of time.

37. An automatic auxiliary axle control system for a load-transporting motor vehicle as set forth in claim 1 wherein
the control system is adapted to accept and utilize weight information provided by a sensor on the vehicle sensing the weight on a primary axle only when the vehicle is stationary and readings provided by the sensor do not fluctuate over a prescribed percentage for a prescribed length of time.

38. An automatic auxiliary axle control system for a load-transporting motor vehicle as set forth in claim 1 wherein
the control system is adapted to provide notification of the stowing and deployment of each auxiliary axle.

39. An automatic auxiliary axle control system for a load-transporting motor vehicle as set forth in claim 1 wherein
the control system is adapted to provide notification that the auxiliary axle usage has been accomplished.

40. An automatic auxiliary axle control system for a load-transporting motor vehicle as set forth in claim 1 wherein
the control system is adapted to provide notification that the auxiliary axle usage has not been accomplished.

41. An automatic auxiliary axle control system for a load-transporting motor vehicle as set forth in claim 1 wherein
the control system is adapted to provide notification that the need for auxiliary axle usage has been detected.

42. An automatic auxiliary axle control system for a load-transporting motor vehicle as set forth in claim 1 wherein
the control system is adapted to provide notification that the maximum allowable gross vehicle weight has been exceeded.

43. An automatic auxiliary axle control system for a load-transporting motor vehicle as set forth in claim 1 wherein
the control system is adapted to indicate the current weight carried by each of the axles then supporting the vehicle.

44. An automatic auxiliary axle control system for a load-transporting motor vehicle as set forth in claim 1 wherein
the forward-most primary axle has steerable wheels and a prescribed minimum allowable axle carrying weight assigned thereto, and
the control system is adapted to effect the auxiliary axle usage such that the resulting weight carried by the forward-most primary axle is not less than its minimum allowable axle carrying weight.

45. An automatic auxiliary axle control system for a load-transporting motor vehicle as set forth in claim 1 wherein
the forward-most primary axle has steerable wheels and each of the primary axles and available auxiliary axles has a prescribed minimum allowable axle carrying weight assigned thereto, and
the control system is adapted to effect the auxiliary axle usage such that the resulting weight carried by each of the primary axles and each of the available auxiliary axles deployed is not less than its minimum allowable axle carrying weight.

46. An automatic auxiliary axle control system for a load-transporting motor vehicle as set forth in claim 1 wherein
the control system employs a programmable logic controller in detecting the need for auxiliary usage and in effecting the auxiliary axle usage provided.

47. An automatic auxiliary axle control system for a load-transporting motor vehicle as set forth in claim 1 wherein
there is only one auxiliary axle.

48. An automatic auxiliary axle control system for a load-transporting motor vehicle as set forth in claim 1 wherein
there are two or more auxiliary axles, and
the control system is adapted to effect the auxiliary axle usage employing the minimum number of auxiliary axles possible.

49. An automatic auxiliary axle control system for a load-transporting motor vehicle as set forth in claim 1 wherein
the primary axles consist of an axle with steerable wheels and a powered axle.

50. An automatic auxiliary axle control system for a load-transporting motor vehicle as set forth in claim 1 wherein
the primary axles consist of an axle with steerable wheels and powered tandem axles.

51. An automatic auxiliary axle control system for a load-transporting motor vehicle as set forth in claim 1 wherein
there is only one auxiliary axle and it is a pusher axle.

52. An automatic auxiliary axle control system for a load-transporting motor vehicle as set forth in claim 1 wherein
there are multiple auxiliary axles comprising multiple pusher axles.

53. An automatic auxiliary axle control system for a load-transporting motor vehicle as set forth in claim 1 wherein
there is only one auxiliary axle and it is a tag axle.

54. An automatic auxiliary axle control system for a load-transporting motor vehicle as set forth in claim 1 wherein
there are multiple auxiliary axles comprising multiple tag axles.

55. An automatic auxiliary axle control system for a load-transporting motor vehicle as set forth in claim 1 wherein
there in only one auxiliary axle and it is a trailing axle.

56. An automatic auxiliary axle control system for a load-transporting motor vehicle as set forth in claim 1 wherein
there are multiple auxiliary axles comprising multiple trailing axles.

57. An automatic auxiliary axle control system for a load-transporting motor vehicle as set forth in claim 1 wherein
there are multiple auxiliary axles comprising a pusher axle and a tag axle.

58. An automatic auxiliary axle control system for a load-transporting motor vehicle as set forth in claim 1 wherein
there are multiple auxiliary axles comprising a pusher axle and a trailing axle.

59. An automatic auxiliary axle control system for a load-transporting motor vehicle as set forth in claim 1 wherein
there are multiple auxiliary axles comprising multiple pusher axles and a trailing axle.

60. An automatic auxiliary axle control system for a load-transporting motor vehicle as set forth in claim 1 wherein
there are multiple auxiliary axles comprising multiple pusher axles and multiple trailing axles.

61. An automatic auxiliary axle control system for a load-transporting motor vehicle as set forth in claim 1 wherein
there are multiple auxiliary axles comprising a pusher axle and a tag axle and multiple trailing axles.

62. An automatic auxiliary axle control system for a load-transporting motor vehicle as set forth in claim 1 wherein
the primary axles include non-powered tandem axles with steerable wheels, and
there are multiple auxiliary axles including a pusher axle.

63. An automatic auxiliary axle control system for a load-transporting motor vehicle as set forth in claim 1 wherein the primary axles include non-powered tandem axles with steerable wheels, and there are multiple auxiliary axles including a pusher axle and a trailing axle.

64. An automatic auxiliary axle control system for a load-transporting motor vehicle as set forth in claim 1 wherein the primary axles include non-powered tandem axles with steerable wheels, and there are multiple auxiliary axles including a pusher axle and multiple trailing axles.

65. An automatic auxiliary axle control system for a load-transporting motor vehicle as set forth in claim 1 wherein the vehicle has a trailer hitched thereto that is supported by an axle that is available to also serve as a trailing axle.

66. An automatic auxiliary axle control system for a load-transporting motor vehicle as set forth in claim 1 wherein the vehicle has a trailer hitched thereto that is supported by a pair of axles that are available to also serve as trailing axles.

67. An automatic auxiliary axle control system for a load-transporting motor vehicle as set forth in claim 1 wherein the control system is adapted to effect auxiliary axle usage utilizing auxiliary axle usage specified at any time by an operator of the vehicle.

68. An automatic auxiliary axle control system for a load-transporting motor vehicle as set forth in claim 1 wherein the control system is adapted to allow an operator of the vehicle to specify the stowing or deploying of any auxiliary axle, and the control system is adapted to effect auxiliary axle usage utilizing the specified stowing or deploying of any auxiliary axle while maintaining control of any auxiliary axle usage that has not been specified by the vehicle operator.

69. An automatic auxiliary axle control system for a load-transporting motor vehicle as set forth in claim 1 wherein the control system is adapted to allow an operator of the vehicle to specify the loading of any auxiliary axle when deployed provided the specified loading is an acceptable loading that is not less than this auxiliary axle's prescribed minimum allowable carrying weight and not greater than this auxiliary axle's prescribed maximum allowable carrying weight, and the control system is adapted to effect auxiliary axle usage utilizing the acceptable specified loading of any auxiliary axle while maintaining control of any auxiliary axle usage that has not been specified by the vehicle operator.

70. An automatic auxiliary axle control system for a load-transporting motor vehicle as set forth in claim 1 wherein the control system is adapted to allow an operator of the vehicle to specify the stowing or deploying of any auxiliary axle specified by an operator of the vehicle and the loading of any auxiliary axle when deployed specified by the vehicle operator provided the specified loading is an acceptable specified loading that is not less than this auxiliary axle's prescribed minimum allowable carrying weight and not greater than this auxiliary axle's prescribed maximum allowable carrying weight, and the control system is adapted to effect auxiliary axle usage utilizing the specified stowing or deploying of any auxiliary axle and an acceptable specified loading of any auxiliary axle while maintaining control of any auxiliary axle usage that has not been specified by the vehicle operator.

* * * * *